United States Patent
Agrawal et al.

(10) Patent No.: US 12,277,233 B1
(45) Date of Patent: Apr. 15, 2025

(54) INTELLIGENT AI RISK MANAGEMENT FRAMEWORK

(71) Applicant: CIMCON Software, LLC, Westford, MA (US)

(72) Inventors: Sanjay Agrawal, Westford, MA (US); Anant Agrawal, Westford, MA (US); Samarth Agrawal, Westford, MA (US)

(73) Assignee: CIMCON Software, LLC, Westford, MA (US)

( * ) Notice: Subject to any disclaimer, the term of this patent is extended or adjusted under 35 U.S.C. 154(b) by 0 days.

(21) Appl. No.: 18/757,198

(22) Filed: Jun. 27, 2024

Related U.S. Application Data

(60) Provisional application No. 63/614,478, filed on Dec. 22, 2023.

(51) Int. Cl.
  *G06F 21/00* (2013.01)
  *G06F 21/57* (2013.01)

(52) U.S. Cl.
  CPC ...... *G06F 21/577* (2013.01); *G06F 2221/033* (2013.01)

(58) Field of Classification Search
  CPC .. G06F 21/36; G06F 3/04817; G06F 11/3672; G06F 11/2273; G06F 21/577; G06F 2221/033; G06F 3/0482; G06F 11/3684
  See application file for complete search history.

(56) References Cited

U.S. PATENT DOCUMENTS

2024/0202405 A1* 6/2024 Lang ...................... G06F 30/27

* cited by examiner

*Primary Examiner* — Tri M Tran
(74) *Attorney, Agent, or Firm* — Fish & Richardson P.C.

(57) ABSTRACT

Methods, systems, and apparatus, including computer programs encoded on a computer storage medium, for managing the risks inherent in using machine learning and artificial intelligence (AI) tools. In one aspect, a system comprises accessing, by one or more computing devices, a repository of files, and analyzing, by the one or more computing devices, files stored in the repository to identify a subset of the files as candidates that contain or are potentially generated at least in part using one or more artificial intelligence (AI) processes. In another aspect, a system comprises identifying, based at least on one or more attributes indicative of artificial intelligence (AI) usage in a file, one or more automated tests to perform on the file, performing a user-selected automated test, storing results of the performed automated test to an inventory record, and using the results of the automated test to train a machine learning model.

42 Claims, 21 Drawing Sheets

850 ─┐
    ↘
| Disposition Configuration |

Policy Name  [ Archive ▾ ] ─ 860
Action       ○ Investigate  ○ Move  ○ Delete  ○ Retain ─ 865
☐ Automatically Add to Inventory ─ 870

875 ─ ☐ Group File Copies  ☐ Automatically Start Workflow
      Workflow Template  [ -- Select Template -- ▾ ] ─ 880
      User(s) for Start Task  ☐ NTFS Owner  Select User(s)

885 ─ Investigate  [ 0 ]  days after scan date

[🔳 Save] [✕ Clear]

| Action | Auto Add to Inventory | Group File Copy | Workflow Template | User(s) | Move To | Investigate/Move/Delete/Retain |
|---|---|---|---|---|---|---|
| | | | | | | |

[▦ Disposition Configuration by Policy]

FIG. 6B

| | Group Name —920 | Group Type | Department | Files | Auto-Move to Excluded Files | Auto-Associate to EUC | EUC Name | EUC Number | EUC Owner |
|---|---|---|---|---|---|---|---|---|---|
| ☐ | All Errors | Other | Finance | 1 | ☐ | | ☐ | | |
| ☐ | Account Department Bank | Excel | Finance | 1 | ☐ | | ☐ | | |
| ☐ | Accounts Receivable Log | Excel | Finance | 1 | ☐ | | ☐ | | |
| ☐ | AdventureWork Sales Data | Excel | Finance | 1 | ☐ | | ☐ | | |
| ☐ | ALL | Other | Finance | 1 | ☐ | | ☐ | | |
| ☐ | all Keywords | Other | Finance | 1 | ☐ | | ☐ | | |
| ☐ | Analytic OP | Excel | Finance | 2 | ☐ | | ☐ | | |
| ☐ | Analytics App | Other | Finance | 2 | ☐ | | ☐ | | |
| ☐ | Append Queries | Other | Finance | 1 | ☐ | | ☐ | | |
| ☐ | ASK AI in EXCEL (Digit) | Excel | Finance | 1 | ☐ | | ☐ | | |
| ☐ | ASK GPT in EXCEL (Digit) | Excel | Finance | 1 | ☐ | | ☐ | | |
| ☐ | Asset Details (Quarter) | Access | Finance | 1 | ☐ | | ☐ | | |
| ☐ | Assets(Quarter) | Access | Finance | 1 | ☐ | | ☐ | | |
| ☐ | Audit Analysis | Excel | Finance | 1 | ☐ | | ☐ | | |
| ☐ | balance parenthesis | Other | Finance | 1 | ☐ | | ☐ | | |
| ☐ | batch file rename | Other | Finance | 1 | ☐ | | ☐ | | |

FIG. 7A

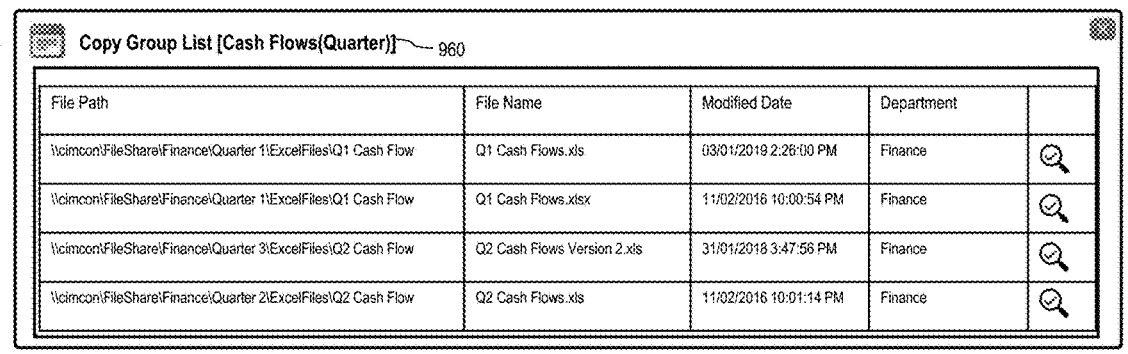

| File Path | File Name | Modified Date | Department | |
|---|---|---|---|---|
| \\cimcon\FileShare\Finance\Quarter 1\ExcelFiles\Q1 Cash Flow | Q1 Cash Flows.xls | 03/01/2019 2:26:00 PM | Finance | 🔍 |
| \\cimcon\FileShare\Finance\Quarter 1\ExcelFiles\Q1 Cash Flow | Q1 Cash Flows.xlsx | 11/02/2016 10:00:54 PM | Finance | 🔍 |
| \\cimcon\FileShare\Finance\Quarter 3\ExcelFiles\Q2 Cash Flow | Q2 Cash Flows Version 2.xls | 31/01/2018 3:47:56 PM | Finance | 🔍 |
| \\cimcon\FileShare\Finance\Quarter 2\ExcelFiles\Q2 Cash Flow | Q2 Cash Flows.xls | 11/02/2016 10:01:14 PM | Finance | 🔍 |

Copy Group List [Cash Flows(Quarter)] — 960

| Question Master | | | | | − □ X |
|---|---|---|---|---|---|

Question: As the Reviewer of the underlying process for the EUC, I confirm: ─1562
• For new EUCs I am approving both their creation and their use in a production process. I acknowledge the creation/changes of this tooling are occurring outside of the Banks Technology Managed Application.

Correct answer: Yes ─1564        Default answer: No ─1568

Necessity: Mandatory ─1566

1570

| Question | Correct | Default | Necessity | Verify |
|---|---|---|---|---|
| Formula change verified? | Yes | No | Mandatory | Yes |
| Link changes verified? | Yes | No | Mandatory | Yes |
| Macro changes verified? | Yes | No | Mandatory | Yes |
| Query changes verified? | Yes | No | Mandatory | Yes |
| Compared against previous version? | Yes | No | Mandatory | Yes |
| Task change verified? | Yes | No | Mandatory | Yes |
| Metadata change verified? | Yes | No | Mandatory | Yes |
| Challenge Question 1 | Yes | No | Optional | No |

As the Reviewer of the underlying process for the EUC, I confirm:
i. For new EUCs, I am approving both their creation and their use in a production process. I acknowledge the creation/changes of this tooling are occurring outside of the Banks Technology Managed Application.
ii. I have validated the information and checked the evidences.
iii. I agree that this EUC is linked correctly to the process taxonomy.

☐ Default Question        [Add]  [Delete]  [Save]  [Cancel]  [Close]
                                             1580

FIG. 10B

INTELLIGENT AI RISK MANAGEMENT FRAMEWORK

CROSS-REFERENCE TO RELATED APPLICATION(S)

This application claims the benefit of U.S. Provisional Application No. 63/614,478, filed Dec. 22, 2023, the contents of which are incorporated herein by reference.

BACKGROUND

Machine learning and artificial intelligence (AI) are being used for various tasks, ranging from numerical value prediction and classification to system monitoring and content generation.

SUMMARY

This specification describes a system that can identify and manage the risks inherent in using machine learning and artificial intelligence (AI) tools to perform everyday tasks. AI processes—including generative AI—are being widely used for various applications, ranging from writing professional letters, chats, blogs, white papers, code, to fraud detection, portfolio optimization, providing customer support, and personalizing the customer experience. For example, generative AI tools based on Natural Language Processing (NLP) or Large Language Models (LLM) are being used for generating content ranging from various forms of textual content to images, videos, and even software codes, while AI models based on supervised, unsupervised, reinforced, or deep learning are being used to predict a wide range of outcomes ranging from credit scores to patient healthcare outcomes. Often, AI is embedded in third party applications without users even being aware of the presence of AI models and the risk that they pose.

With the advent of increasingly popular and novel uses of AI processes, the need to understand where AI is being used and the impact of AI and its associated risks has become more important than ever, for example, to ensure that the AI tools and processes are being used in compliance with applicable ethical and regulatory rules, guidelines and regulations. The technology described herein provides an intelligent risk management framework to automate the identification of AI files and models, assign a risk score based on various AI attributes, and manage the risk from those AI files. In particular, the technology can be configured to perform a scan of a file system in order to identify AI files and various risk attributes and determine candidate files for adding to inventory tracking and monitoring.

The system automatically identifies and tracks AI files within a repository to understand linkages and dependencies between the files, for example, across an enterprise-scale system. The files can then be analyzed to identify high-risk candidates, which in turn can be evaluated further to determine one or more performance criteria associated with the underlying AI processes/tools.

According to a first aspect, a method described herein includes accessing, by one or more computing devices, a repository of files stored on one or more computer-readable storage devices, and analyzing, by the one or more computing devices, files stored in the repository to identify a subset of the files as candidates that are potentially generated at least in part using one or more artificial intelligence (AI) processes, wherein the identified subset includes files each of which includes an attribute or content indicative of AI usage.

In some implementations, the method further includes identifying a corresponding set of attributes for each candidate, determining a subset of the candidates based on these attributes, and performing one or more automated tests on the determined subset of candidates.

In some implementations, the method wherein accessing the repository of files stored on one or more computer-readable storage devices further includes accessing the repository of files in a first scan in accordance with a set of one or more configurable scanning parameters, and identifying one or more files in the first scan in accordance with the set of one or more configurable scanning parameters.

In some implementations, the method further includes using results of the first scan in a second scan, wherein using the results includes filtering the one or more files identified in the first scan in accordance with a second set of one or more configurable scanning parameters selected from a group consisting of: target folders, target drives, file types, file age, file compression technology, scan depth, and keywords.

In some implementations, the method wherein accessing the repository of files stored on one or more computer-readable storage devices includes accessing one or more of a local desktop file system, a network file system, or a cloud repository file system used by one or more users.

In some implementations, the method wherein analyzing the files stored in the repository further includes, for each file, identifying one or more attributes of the file using one or more of file metadata, file location, or file contents.

In some implementations, the method wherein analyzing the files stored in the repository further includes, for each file, identifying one or more attributes of the file using one or more of file metadata, file location, or file contents, and wherein identifying one or more attributes of the file using one or more of file metadata, file location, or file contents includes, for each file: identifying a file name, file type, attributes specific to the file type, one or more file authors, and organizational information pertaining to the file, identifying one or more dates of modification, dates of last access, and an author associated with the last modification, determining a file size, identifying a location of the file in the repository with respect to one or more file system hierarchies in the repository, determining security rights of the file in the repository, identifying one or more keywords within the file, and identifying one or more attributes or content indicative of AI usage in the file.

In some implementations, the method wherein identifying the one or more attributes or content indicative of AI usage includes identifying at least one of: a file extension associated with an AI tool, a reference to a generative AI tool, a reference to a library, algorithm, keyword or folder associated with an AI tool, outputs of an AI file, a segment of code, or a number of lines of code.

In some implementations, the method wherein identifying the corresponding set of attributes for each candidate includes identifying the presence of sensitive information.

In some implementations, the method wherein identifying the corresponding set of attributes for each candidate includes identifying one or more code-based factors for each code-containing candidate by performing a code quality assessment for one or more types of errors and warnings.

In some implementations, the method further includes identifying one or more libraries and library versions installed on the one or more computer-readable storage devices.

In some implementations, the method further includes identifying vulnerabilities associated with each version of the identified library versions using a security vulnerability database, wherein the security vulnerability database includes a set of determined security vulnerabilities associated with each version of the identified library.

In some implementations, the method wherein identifying the corresponding set of attributes for each candidate includes: evaluating associated input and output dependencies of each candidate, wherein the associated dependencies include one or more of libraries, files, or import modules, and displaying a visual representation of the identified input and output dependencies for each candidate on a graphical user interface, wherein the visual representation includes an interconnected AI map of one or more objects representing a sequence of inputs to outputs in accordance with the dependencies at a specified-hierarchy level, wherein the objects are indicative of dependency information including a type of dependency, a scan status, and a type of dependency.

In some implementations, the method further includes, through an interaction taken on the graphical user interface, for each candidate, viewing the candidate, adding the candidate to inventory or monitoring, assigning the candidate to a policy categorization, or removing the candidate from future scans.

In some implementations, further including determining a risk score for each candidate using the corresponding set of attributes.

In some implementations, the method wherein determining the risk score for each candidate includes assigning a risk weight to each attribute in the corresponding set of attributes, determining a number of instances of each attribute in the corresponding set of attributes, and for each attribute, multiplying the risk weight with the number of instances of the attribute and aggregating to determine an aggregate risk score for the candidate as the risk score.

In some implementations, the method further includes receiving one or more threshold values, each threshold value indicative of a respective level of risk, and comparing the risk score of each candidate to each threshold value to determine the level of risk for each candidate.

In some implementations, the method further includes, for each candidate, calculating a percentage of risk contribution for each attribute, and displaying the percentages in a risk score card including a visual representation of the percentages on a graphical user interface.

In some implementations, the method determining the subset of the candidates further includes using a risk identification model configured to process a set of file attributes for each candidate to generate an indication of whether the candidate is a high-risk candidate, wherein the risk identification model has been trained by operations including training the risk identification model on a training data set of previously identified and assessed candidates comprising one or more risk attributes.

In some implementations, the method further includes grouping copies of a file in the subset of candidates as a single candidate, or grouping versions of a file in the subset of candidates as a single candidate.

In some implementations, the method wherein determining the subset of candidates further includes assigning a label to each candidate in the subset of candidates, and wherein assigning includes using a calculator engine configured to enact one or more arithmetical and logical operations as a calculation on the candidates based on the corresponding set of attributes, and determining one or more assigned labels based on the calculation.

In some implementations, the method further includes enacting one or more actions on a subset of candidates identified based at least on the one or more assigned labels, the one or more actions including: retaining the subset of candidates for further assessment, deleting the subset of candidates from the repository, moving the subset of candidates to a new location in the repository, adding the subset of candidates to a maintained file inventory, starting a workflow using a pre-built workflow template, and identifying copies of files within the subset of candidates.

In some implementations, the method wherein performing one or more automated tests on the determined subset of candidates further includes identifying one or more automated tests to perform on the subset of candidates based on a determined risk score or assigned label, and adding results of the performed one or more automated tests to an inventory record.

In some implementations, the method wherein identifying one or more automated tests includes identifying one or more tests from a group consisting of a fairness assessment, an interpretability assessment, a validity assessment, a reliability assessment, and a data drift assessment.

In some implementations, the method further includes starting a workflow based on at least one result of the one or more automated tests, or sending a notification to one or more identified relevant users based on at least one result of the one or more automated tests.

In some implementations, the method wherein starting a workflow using a pre-built workflow template includes generating a workflow task form configured to accept one or more user-inputs pertaining to values associated with an outcome of the task in accordance with a user-configured identification of one or more user-inputs solicited from one or more users or groups assigned to the task for completion of the task, wherein the user-configured identification of the one or more user-inputs includes a set of questions indicated as required or optional for task completion, and wherein the one or more users or one or more groups of users are dynamically assigned using a user-input value from a preconfigured metadata form.

In some implementations, the method further includes preventing the workflow from advancing based at least on the one or more user-inputs entered into the workflow task form.

According to a second aspect, a method described herein includes identifying, based at least on one or more attributes indicative of artificial intelligence (AI) usage in a file, one or more automated tests to perform on the file, providing the identified one or more automated tests in a graphical user-interface including a set of test icons, receiving, through the graphical user-interface, an indication of an automated test to perform from a user selecting a first test icon, performing the automated test corresponding to the first test icon, storing results of the performed automated test to an inventory record, and using the results of the automated test to train a machine learning model to generate an output including one or more of model behavior, compliance, or risk status of a file.

In some implementations, the method wherein identifying one or more automated tests to perform on a file includes identifying one or more tests from a group consisting of an AI fairness assessment, an AI interpretability assessment, an AI validity assessment, an AI reliability assessment, and a data drift assessment.

In some implementations, the method further includes performing the automated test corresponding to the first test icon on a subset of candidate files based on a determined risk score or assigned label.

According to a third aspect, a method described herein includes receiving, through a user-interface including a user-configurable identification of a set of metadata fields, a first set of user-inputs including multiple attributes pertaining to data to be stored in a database, each user-input specifying, for each of the multiple attributes, an entry corresponding to at least a subset of the metadata fields, generating a data entry form configured to accept a second set of user-inputs pertaining to values associated with at least a subset of the multiple attributes, wherein the data entry form is automatically generated based on the user-configurable identification of the set of metadata fields, receiving data including the second set of user-inputs through the data entry form displayed on an electronic display device, and storing the data in the database.

In some implementations, the method wherein receiving the first set of user-inputs including multiple attributes pertaining to data to be stored in the database further includes receiving a corresponding set of color, placement, and containerization instructions relating to one or more of a tab and group layout, wherein the set of color, placement, and containerization instructions indicate at least a location and color of the first-set of user-inputs for display on the electronic display device.

In some implementations, the method further includes generating the database based at least on the first set of user-inputs.

In some implementations, the method wherein receiving the first set of user-inputs further includes receiving the first set of user-inputs from an administrator, and wherein receiving the second set of user-inputs through the data entry form further includes receiving the second set of user-inputs from a user entering data in the data entry form.

In some implementations, the method wherein the multiple attributes of the first set of user-inputs include one or more calculable fields that are derived from at least one metadata field.

In some implementations, the method further includes deriving the calculable fields using a calculator engine configured to enact one or more arithmetical and logical operations to the at least one metadata field.

In some implementations, the method further includes calculating a risk assessment using the calculator engine.

According to a fourth aspect, a method described herein includes receiving, through a graphical user-interface including a set of task icons indicative of respective tasks and one or more placeable links for connecting pairs of task icons, a sequence of tasks in a workflow through an arrangement of the task icons into an order using the one or more placeable links and an assignment of each task icon to one or more users or one or more groups of users, enacting one or more tasks in the sequence of tasks in the workflow, wherein enacting includes generating a workflow task form configured to accept one or more user-inputs pertaining to values associated with an outcome of the task in accordance with a user-configured identification of the one or more user-inputs solicited from the one or more users or groups assigned to the task for completion of the task, receiving data including the one or more user-inputs entered through a display of the workflow task form on an electronic device, and storing the data in a database.

In some implementations, the method wherein the user-configured identification of the one or more user-inputs includes a set of questions indicated as required or optional for task completion.

In some implementations, the method further includes preventing the workflow from advancing based at least on the one or more user-inputs.

In some implementations, the method wherein the one or more users or one or more groups of users are dynamically assigned using a user-input value from a pre-configured metadata form.

According to a fifth aspect, a method described herein includes monitoring a file automatically for changes, and, in response to a detected change, generating an audit trail including data derived from the changes, and storing the generated audit trail in a database.

In some implementations, the method further includes determining a measure of risk for the detected change, and, in response to an identification of a high-risk change, identifying and executing one or more tasks, wherein the one or more tasks are identified from a group consisting of: alerting one or more users or groups of users, starting a workflow, securing the file, requiring verification of the detected change, and highlighting the change.

In some implementations, the method wherein determining the measure of risk for the detected change includes processing data relating to the detected change using a machine learning model to predict a measure of risk of the detected change.

In some implementations, the method further includes training the machine learning model using logged data relating to previously detected changes.

Particular embodiments of the subject matter described in this specification can be implemented so as to realize one or more of the following advantages: (a) the automated identification of AI files and processes in a company network or embedded in third party applications, which may not be become known to the firm otherwise, (b) providing further insight to the organization into these files as to code quality, cybersecurity risks, privacy risks, data and model dependencies, human vs. generative AI content (c) distilling all the multiple risk attributes into a single risk score that can be used to prioritize a multitude (e.g., millions) of files and help organizations focus in on files of greatest risk, thereby saving valuable computing resources by first performing a fast scan, and then a more detailed scan based on the results of the fast scan (d) providing a range of automated tests that can be run on the identified AI files to comply with laws, e.g., with minimal user AI knowledge and expertise required, thereby reducing reliance on scare AI resources (e) providing a framework to manage AI risks by inventorying and monitoring the AI files with accountability and tracking. Collectively, the system identifies risks that an organization, e.g., company, would not be able to uncover otherwise, does them at scale by scanning the entire organization network, saving valuable time and scarce resources in this process.

The systems described herein can be configured to unify the risk management process of files into an organized framework with high configurability. The system can provide for configuration of one or more of a discovery, workflow, inventory, or change management modules in order to allow a user to identify files that the user would like to track in an inventory or monitor in an audit trail. More specifically, this system facilitates the generation, logging, and collection of metadata and audit trail data in an automated and modular manner, which reduces the amount of time and effort a user needs to dedicate to ensure that risks are properly managed. Furthermore, the system can maintain relationships between each of the modules to facilitate interactions that improve the system, e.g., by using data generated as part of one module to improve the functioning of another module with respect to a user's customized risk assessment configuration. In particular, the system can be specialized to provide a tailored risk management user experience based on learning customer-specific requirements through user configurations.

Additionally, the system can be configured through user-interfaces, e.g., without the need for manual coding, to generate form, testing and workflow segments addressing one or more configurable parameters of the discovery, workflow, inventory, and change management modules. Such automated reconfigurability can enhance usability of files and systems while managing risks associated with use of AI, especially for a user who is not well-versed in configuring and testing systems using code. This can ensure that organizations can execute the necessary AI tests to ensure that their AI systems are reliable and trustworthy, and that they are not exposed to risks due to the lack of coding knowledge at the organization.

The system can also reduce the use of computational resources by aggregating a measure of risk for any number of processed files. In particular, the system can provide a single risk profile based on a set of risk attributes and corresponding values for a number of files, e.g., 100, 500, 1 million files. The ability of the system to distill the risk profile of many files into a risk score, e.g., one value that can facilitate the risk assessment process. For example, the system can use the risk score for one or more downstream calculations, e.g., thereby reducing the computational resources required with respect to maintaining and processing the separate risk values for the set of risk attributes for the downstream calculations. The system also saves valuable hardware and computing resources by (a) first performing a fast scan, and then filtering the results for a more detailed scan (b) scheduling the scan during off-hours when other computing resources are not being used for a more efficient scan, (c) targeting scans to required file locations, file types, and required parameters only, e.g., relative to performing a full scan (d) performing scans only for files that have changed since the last scan or have been modified within a given time interval, e.g., relative to performing a full scan.

Further, the system reduces computational and storage costs by dispositioning files based on risk level, and identifying file copies, for efficient organization and storage. For example, the system can reduce files in storage by identifying low-risk files for deletion, or for movement to another folder. In particular, low-risk files can be moved to a folder that is not monitored as frequently, thereby reducing the computational resources needed to assess and evaluate high-risk files in the first location. As another example, the system can be configured to treat a group of like files as a single entity, e.g., rather than multiple different entities, and apply the same policy to them. Grouping copies of files removes the need to scan each file, thereby saving computational resources.

In addition, the system can reduce the use of computational resources by maintaining risk assessment information in one accessible location as compared to maintaining this information in disparate locations, which can be hard to navigate in order to determine the risk status of a file. For example, rather than repeating file scans or assessments since there was no logging of results or results were performed by multiple users, the system can log actions taken with associated results for candidate files in a central inventory accessible by the multiple users. The inventory can allow users to conduct tests and attach test results to the inventory. All users can view when a file was assessed and evaluate whether or not it needs further assessment based on a number of factors. As another example, the system can prevent the need to pore through isolated documentation in different parts of the file system, e.g., in order to determine which files have been modified recently, or to exhaustively search for metadata of files to identify a user that is accountable for the file, thereby saving computational resources.

Thus, by efficiently scanning a network to identify high-risk files, maintaining an inventory of files and folders at a central repository, allowing automated testing of these files and the storage of test documentation, and automatically logging access attempts, nature of changes etc., the system described herein obviates the need for repeated scanning and assessments across different file systems. This in turn can result in savings in computational resources as well as early identification and mitigation of any risk and/or non-compliance associated with AI files, thereby resulting in reliable usage of such files.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 depicts an example file scan configuration display user-interface, e.g., that can be used to configure a file scan using the discovery module of FIG. 1.

FIGS. 5A and 5B depict examples of a risk score configuration display user-interface, e.g., that can be used to configure a risk assessment of scanned files, and a risk scorecard user-interface illustrating corresponding results, respectively.

FIGS. 6A and 6B depict examples of risk policy configuration display user-interfaces that can be used to configure the management of files based on policy configurations, and define disposition rules for files assigned to each policy label.

FIGS. 7A and 7B demonstrate example user-interfaces for aggregating similar files for management.

FIGS. 10A and 10B illustrate portions of an assignment of roles user-interface, e.g., for specific approval of workflow tasks.

Like reference numbers and designations in the various drawings indicate like elements.

DETAILED DESCRIPTION

The use of AI is ubiquitous. Generative AI tools are being used for various tasks, ranging from textual generation, e.g., writing emails, papers, code, etc., to generation of pictures, video, and other forms of content. Machine learning and AI is being used to perform various complex tasks such as analyzing large volumes of data and predicting the outcome for particular circumstances. Yet, the impact and risks of using AI continue to pose various open questions. In particular, many third party software providers are embedding AI models in their applications and users are using them even without being aware of these models. As such, there is a need for automated tools to identify, track, and mitigate as needed the risks incurred through the use of AI, e.g., in order to advance responsible and ethical AI practices. The technology described herein provides a system for AI risk management that can be configured to perform a file scan in order to identify AI files, whether embedded or otherwise, determine potential risk factors for a repository of files, add files to an inventory, monitor one or more of the files in the inventory, and manage edits and revisions made to the files or its metadata, e.g., through a workflow.

More specifically, the system can provide for the configuration of a file scan to identify attributes of files in a file repository and to evaluate the files for associated risk factors. As an example, the automated tests can include identifying an attribute or content indicative of AI usage or the presence of sensitive personal-identifying information. As another example, the automated tests can include a code quality assessment or a cybersecurity assessment to determine vulnerabilities based on associated code dependencies, e.g., libraries, files, or import modules.

The system can determine a risk score for each file using the identified attributes from the file scan and can be configured to add one or more of the files in an inventory and/or for monitoring. As an example, the system can add a high-risk file to the inventory, and monitor a file automatically for changes, such that in response to a detected change, it can generate audit trail data for the file. The system can also be configured to start a workflow, e.g., a sequence of tasks in an organized process, for the files in the inventory. As an example, the workflow can require responses to questions through a form that the assigned workflow user is required to fill out. The system can allow for the configuration of the form for this and other uses, e.g., entering data into the system.

Figure 1:
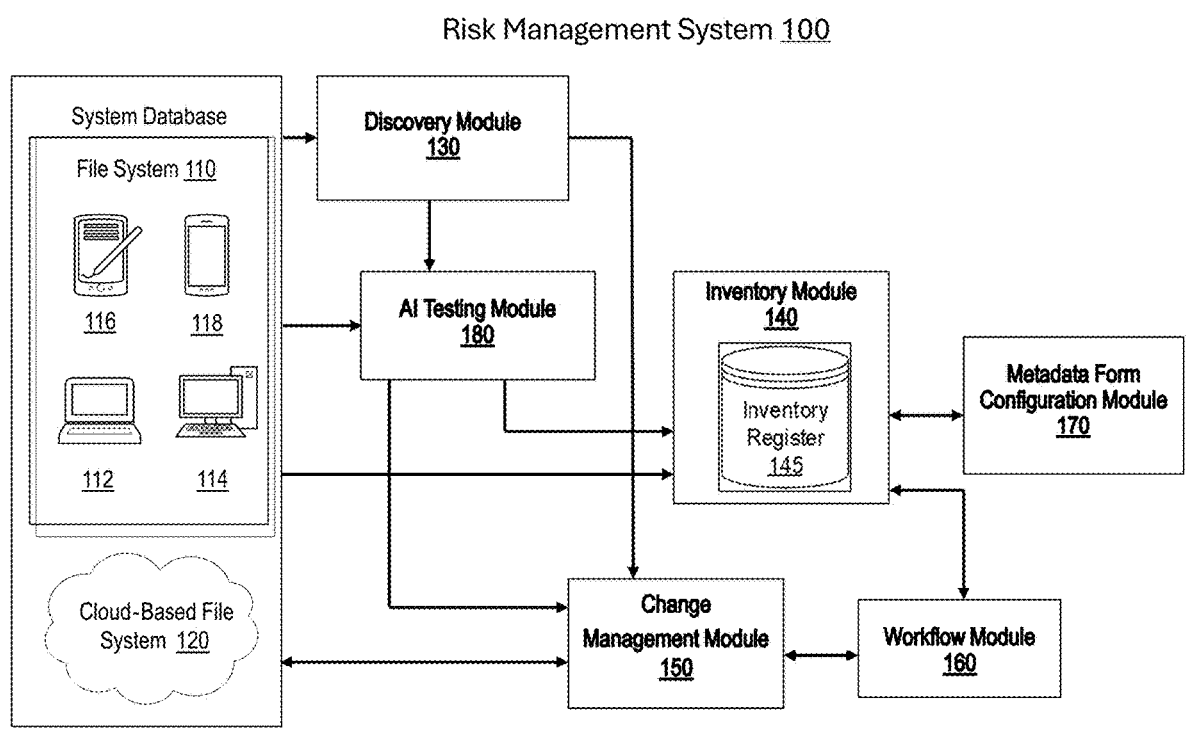
FIG. 1 is a block diagram of an example risk management system.

FIG. 1 shows an example risk management system 100 that can allow for identification, assessment, and analysis of files in a file repository in order to measure risk, monitor changes, and provide a record of modification for accountability and attestation. In the implementation depicted, the system can include a discovery module 130, an inventory module 140, a change management module 150, a workflow module 160, a metadata form configuration module 170, and an AI testing module 180. As an example, each module can maintain a respective database associated with the functions of the module. The system 100 can maintain one or more relationships between modules, e.g., as depicted by the arrows showing interactions between the modules 130-180, as will be described in more detail below. In some implementations, each of the modules can access the inventory register 145, e.g., a database maintained by the inventory module 140 to retrieve or add data to the inventory register 145.

As an example, the discovery module 130, inventory module 140, and change management modules can all access files from a file system 110. As another example, the AI testing module 180 can receive data from a discovery module in order to perform a test, and the results of the test can be stored in the inventory module 140. As another example, the inventory module 140 can be configured using a metadata form provided from the metadata form configuration module 170. As yet another example, a workflow can be configured to be run for a file being maintained by the inventory register 145 or in response to an indication of a change from the change management module 150.

For example, the risk management system 100 can access a repository of files stored on one or more computer-readable storage devices, e.g., by performing a file scan using a discovery module 130 and the scan results stored in a database. In the particular example depicted, the file system 110 can be a file system as maintained on the computer-readable memory of a device, e.g., laptop 112, a desktop computer 114, or a tablet 116, or a remotely-accessible file system that can be accessed using a network, e.g., the internet, an intranet, etc. As another example, the system 100 can access a remote file system, e.g., a cloud-based file system 120.

The risk management system 100 can also be configured to add candidate files based on an evaluation of risk for the file to an inventory module 140 that includes a metadata form configuration module 170 for configuring the generation of a form to enter metadata into the inventory register 145. As an example, the system 100 can monitor one or more files using the change management module 150 that tracks all changes to generate an audit trail and creates a version history of all file changes. In some cases, the files can be accessed from the inventory register 145 or in another database. In other cases, the files can be accessed from the file system 110 or cloud-based file system 120. As another example, the system 100 can organize a review process for a file in the inventory module 140 or the change management module 150 through the configuration of a workflow, e.g., using the workflow module 160. In some cases, the review process can involve checkpoint tasks assigned to one or more particular users and can include a separate workflow questionnaire that must be answered before the workflow task can be completed.

More specifically, the system 100 can be configured to perform the file scan in a file repository, e.g., the file system 110, the cloud-based file system 120, or both, using the discovery module 130. In some cases, the system 100 can be configured to access the repository of files in a particular location in the file repository, e.g., rather than accessing the entire repository, the system 100 can access a subset of the files in the file repository. As an example, the system 100 can be configured to scan one or more target folders, target drives, or file directories. As another example, the system 100 can be configured to scan a repository or particular location for a particular type of file, e.g., a code-containing file, e.g., a Python, C, Java, executable file, etc., based on the file extension. As yet another example, the system 100 can be configured to search one or more keywords in the subset of files. The system 100 can also be configured to filter the results of the first scan to perform a second more detailed file scan.

Figure 2:
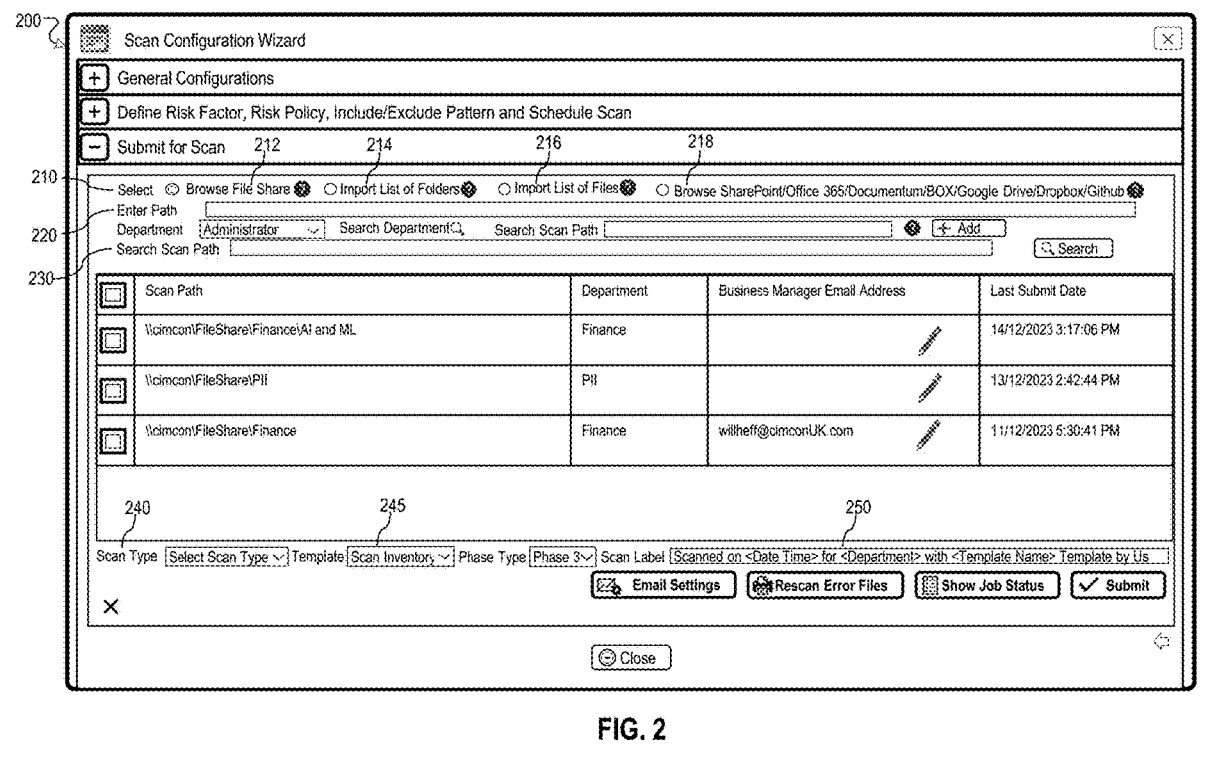

Referring now to FIG. 2, an example user interface depicts a file scan configuration display, e.g., that can be used to configure a file scan using the discovery module of FIG. 1. The system 100 can provide the file scan configuration display 200 such that a user can configure a file scan by specifying a repository of files to be scanned, e.g., using an indication of the type of repository and the corresponding file path specifying a location of the files.

In some implementations, the system 100 can provide a selection button 210 to identify the type of file repository to be scanned. As an example, the system 100 can scan one or more of a file share 212, e.g., a storage resource on a shared hard drive accessible to a number of users over a network, list of folders 214, list of files 216, or URL-accessible file system 218 (Uniform Resource Locator-accessible). In some cases, the type of repository can be used to specify the means of accessing the files. For example, the system 100 can access local repositories located on-device using a different method than remote cloud-based repositories, code repositories, or other URL-accessible repositories. In the particular example depicted, the user has elected to scan a file share 212 using the selection button 210.

In the case in which the user has elected to browse a URL-accessible repository, the system 100 can access the remote repository by making a call to the webpage that exposes the repository. As an example, the system 100 can access one or more files accessible in remote cloud storage or a remote shared remote drive using a URL. In some cases, remote storage can include shared text-editing files or code repositories.

As another example, the system 100 can access a number of files by importing a list of folders 214 or list of files 216 that specify files located in different hierarchies of a file repository. In the case in which the user has elected to scan a list of folders 214 or files 216, the user can import or upload the list, e.g., a list that contains file paths for each of the folders or files, to the system. The system 100 can then access the file repository and identify the files selected using the list.

In some implementations, the system 100 can provide a file path entry field 220, e.g., for the user to specify the exact location of the files, e.g., either locally or in the cloud, or for the user to specify the location of the file containing the list of folders 214 or list of files 216. In some cases, the system 100 can additionally provide a file path scan search field 230 to allow the user to search the file repository. The file path scan search field 230 can aid the user in determining exactly which files to select for scanning. As an example, the system 100 can use the selection of the repository type to inform where to search user inputs entered in the file path scan search field 230.

In some implementations, the system 100 can provide a mechanism for the user to save a configured file scan in a log, e.g., using a scan-type identifier 240 and label input field 250. For example, the system 100 can maintain a log of previously configured and performed file scans for user access. In some cases, the system 100 can additionally provide a mechanism for the user to save and access scan-templates, e.g., templates characterizing different types of scans. As an example, a user can perform configure a general type of scan and save the general type as a template for similar scans using a template identifier drop-down 245.

Referring back to FIG. 1, the system 100 can be configured to analyze the files stored in the file repository as part of the file scan to determine one or more attributes that can be further evaluated based on one or more risk factors. For example, the system can identify attributes, e.g., file name, file type, etc., and metadata, e.g., file size, date of last modification, author of last modification, etc.

As an example, the system 100 can be configured to identify a subset of the files as candidates that are potentially generated using AI based on the presence of an attribute or content indicative of AI usage. For example, the system 100 can identify file extensions that pertain to code languages (Python, SQL, R, etc.) or executable files (.exe, .sh, .cmd, .bin, .run, etc.) as code-containing files that potentially include AI content. The system can also evaluate the number of lines of code in a code-containing file as an indicator of file complexity. As another example, the system 100 can identify a reference to a generative AI tool, library, algorithm, keyword, etc. in the file or in the title of the file.

Figure 3:
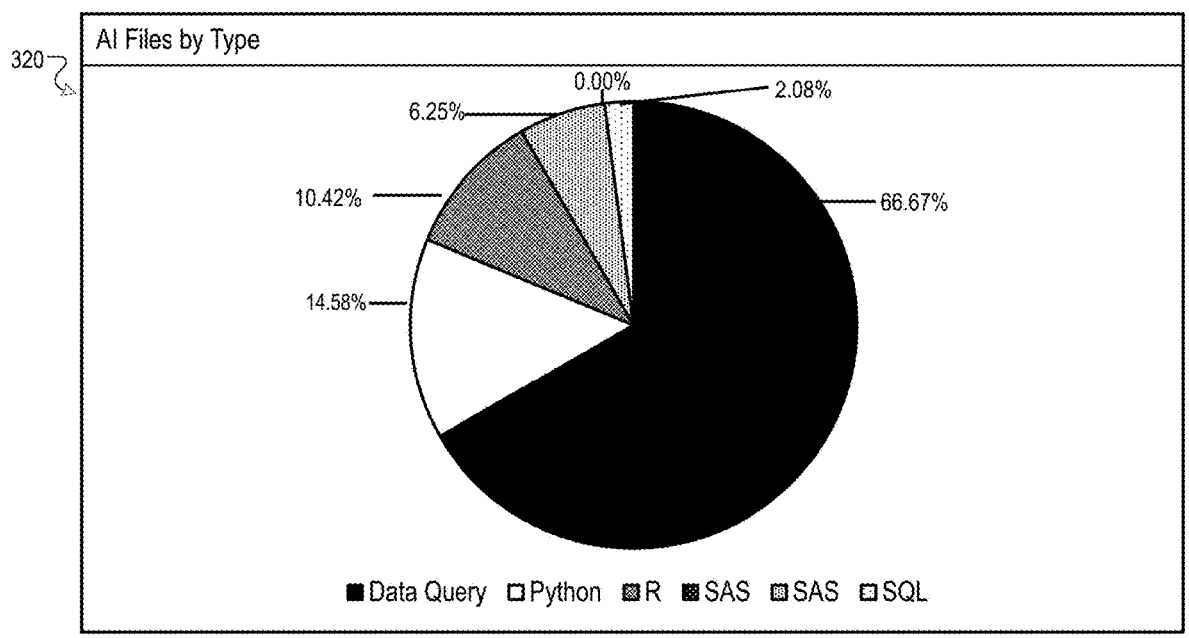
FIG. 3 demonstrates example display result user-interfaces of a file scan of a repository that includes AI files.

Referring now to FIG. 3, examples of display result user-interfaces of a file scan include one or more dashboard visualizations for presenting results of the file scan. In the particular example depicted, the example display result is for a repository containing a number of AI files. AI files are becoming more ubiquitous and can represent more of a risk for organizations since AI files are often more complex than other types of files. As an example, the user can use the file scan configuration display 200 of FIG. 2 to configure a file scan of a repository including the AI files. The file scan can be used to identify the prevalence of AI files in the organization.

The system can provide one or more dashboard visualizations to depict the results of the file scan. In some implementations, the system can provide a dashboard visualization that identifies the file distribution of the types of files in the repository. In some implementations, the system can provide a dashboard visualization that identifies the different types of code contained in the AI files. As an example, the dashboard visualization 320 is a pie chart that represents the relative amounts of the code contained in the AI files in the repository.

Referring back to FIG. 1, the system 100 can also be configured to perform a code quality assessment for files that are identified as code-containing, e.g., files that include at least one instance of code. The code-quality assessment can be used to identify one or more types of errors and warnings and also can be used to identify one or more dependencies, e.g., libraries and library versions installed on the user-devices 112, 114, 116, 118 accessed by the system. In this context, libraries contain reusable code that can be used to modularize commonly used software functionality.

Figure 4A:
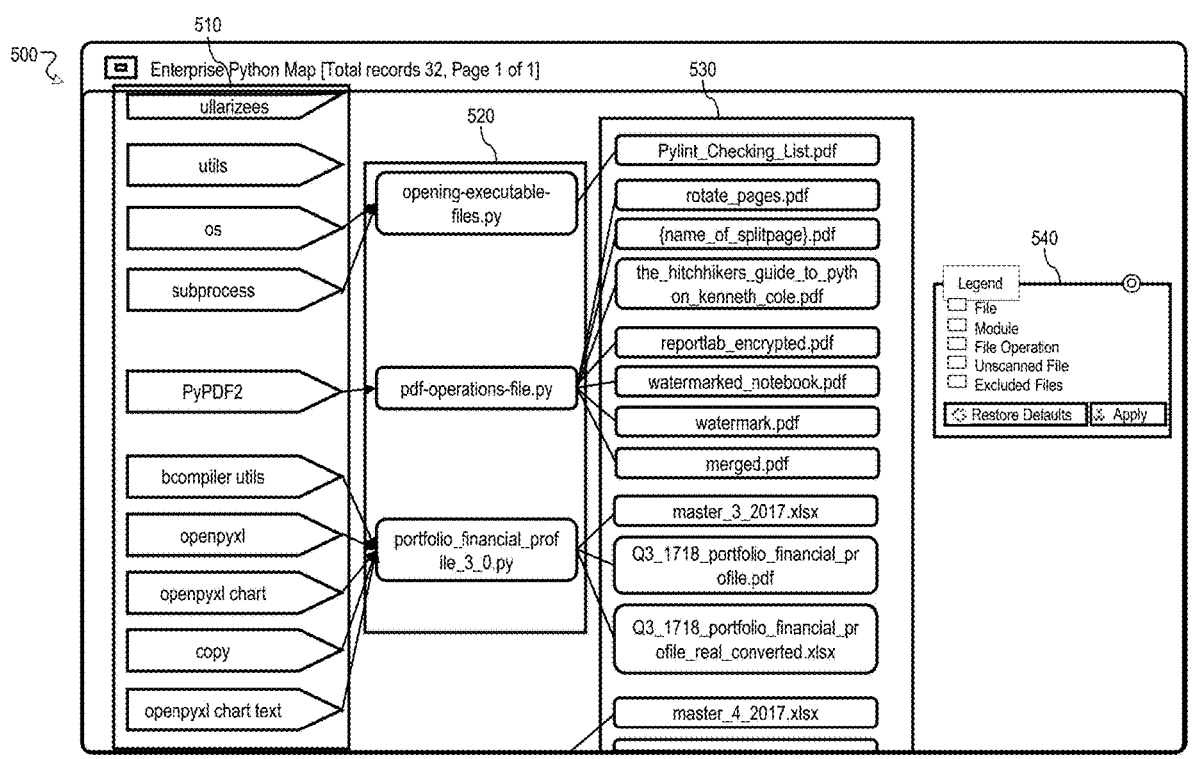
FIGS. 4A and 4B illustrate examples of display results user-interfaces of a library, data and models linkage analysis for a code-containing file identified in a file scan.
Figure 4B:
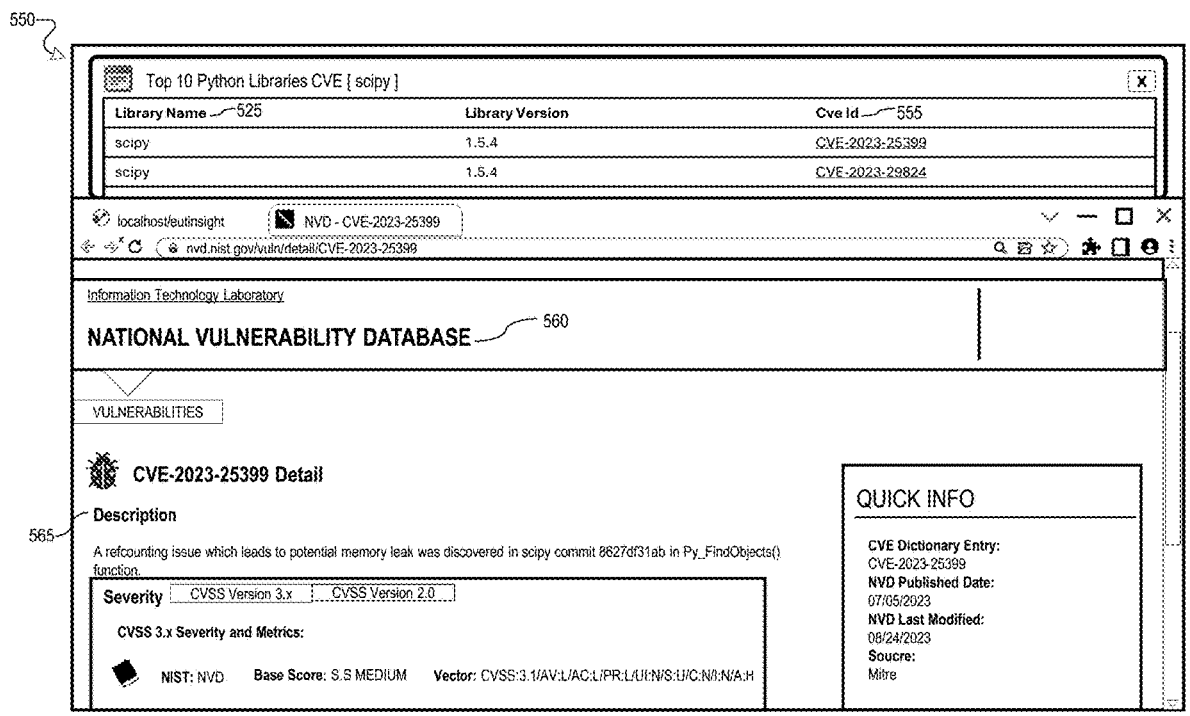

Referring now to FIGS. 4A-4B, example user interfaces illustrate display results of a library linkage analysis for a code-containing file identified in a file scan. In some cases, code-containing files can rely on one or more dependencies, e.g., by importing one or more libraries, modules, or other files configured to provide an object or engine in a set of related files that functions as a program. In this case, the system 100 can map the dependencies of files and present them to the user in a display, e.g., the library linkage map display 500.

In some implementations, the system 100 can provide a map that depicts one or more code-containing files 520 and dependencies 510, e.g., libraries, files, data, other or modules that are considered dependencies for these files 520. For example, a library can be imported or used by the files 520 through a call to an application programming interface. In some cases, libraries are open-source, e.g., available in an unrestricted manner. In other cases, libraries can be closed-source, e.g., proprietary or use-restricted.

In the particular example depicted, the system 100 provides the library linkage map display 500 for three code-containing python files 520. The library linkage map display 500 includes arrows to link the libraries to their respective files 520 and the files 520 to the respective outputs of the files 530, e.g., the files 520 can contain code that generates a file, e.g., a text-containing file, a figure, comma-separated value file, etc. The system 100 can also provide a designation of what type of file is being considered, e.g., a file, module, or file operation, and an indication of each file's file scan status, e.g., unscanned with respect to the file scan depicted in FIG. 2, excluded from future file scans, in a legend 540.

More specifically, the linkage map display 500 can conveniently present a collection of related data that pertains to risk management of code-containing files that is often diffuse, e.g., disparate and hard to unify, throughout a file repository. In the case that the linkage map display 500 illustrates both dependencies 510, files 520, and outputs 530, the linkage map display 500 can facilitate the case of identifying which dependencies 510 were used in the creation of certain output files 530. The system 100 can streamline version-control of code outputs, e.g., code output files, in software development, using the linkage map display 500.

In some implementations, the system 100 can also provide security vulnerability information for public libraries, e.g., libraries as evaluated in a vulnerability database 560, e.g., the National Institute of Standards and Technology (NIST National Vulnerability Database. As an example, when a user clicks on one of the dependencies 510, the system can direct the user to a pop-up display 550 of information about the library version as well as a corresponding security vulnerability identifier 555, e.g., the common vulnerability identifier provided by a governmental entity, by an administrator of the user's system, etc., for an identified security vulnerability of the dependency.

For example, the system 100 can also detect the versions of all libraries 525 installed on the scanned file system 110. In particular, the system 100 can detect multiple versions of a library if installed on a computer, analyze those library versions for cybersecurity vulnerabilities, and provide the link to NIST National Vulnerability Database that identifies those vulnerabilities.

Furthermore, the corresponding security vulnerability identifier 555 can include a link that directs the user to a corresponding webpage which contains further details regarding the security vulnerability identifier 555, e.g., such that the user can browse the corresponding webpage that describes the security vulnerability identifier 555. For example, the system 100 can provide each respective security vulnerability identifier 555 link to the NIST National Vulnerability Database. As another example, the system 100 can provide other related information to the security vulnerability identifier 555, e.g., by opening a pop-up display (not depicted) that includes information from a database of security vulnerability identifiers as provided by an administrator of the user's system.

Referring back to FIG. 1, the system 100 can be configured to determine a risk score for each candidate file using the corresponding set of attributes determined. The system 100 can present the results of the file scan, e.g., on a display such as a risk scorecard as presented in FIGS. 5A-5B, such that a user of the system 100 can view one or more of the scanned files, their associated attributes and the risk contribution of each individual attribute, and the corresponding total risk score.

Figure 5A:
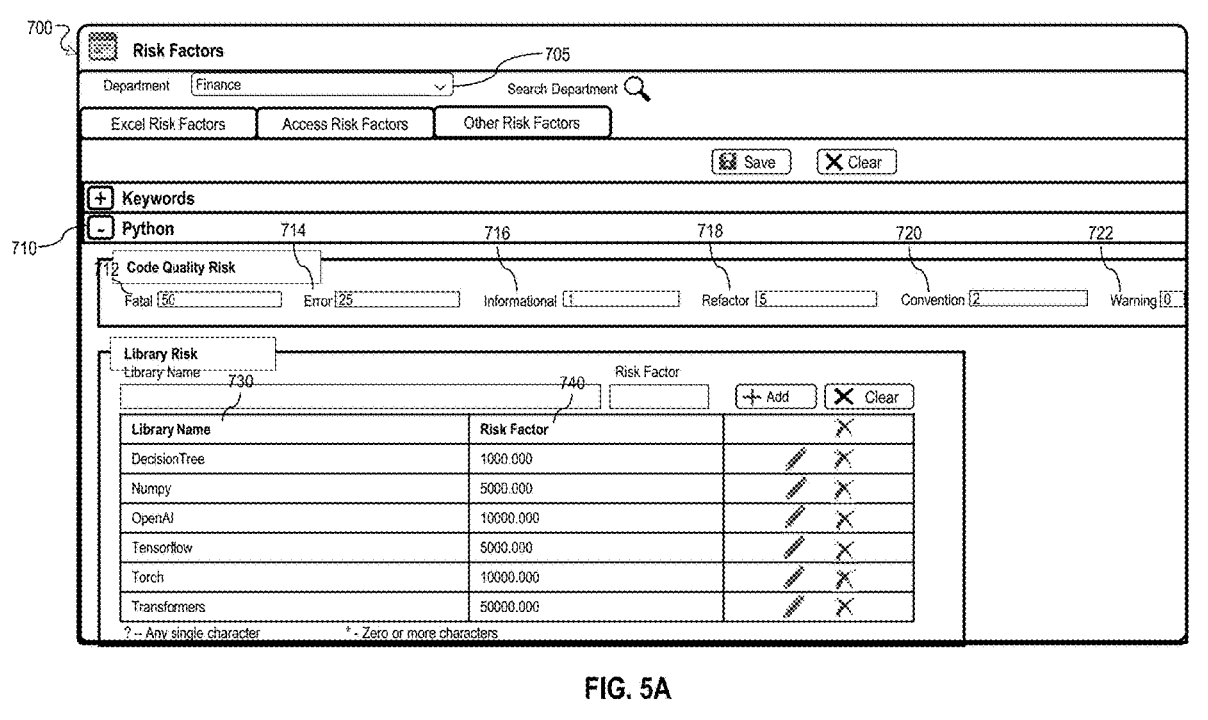
Figure 5B:
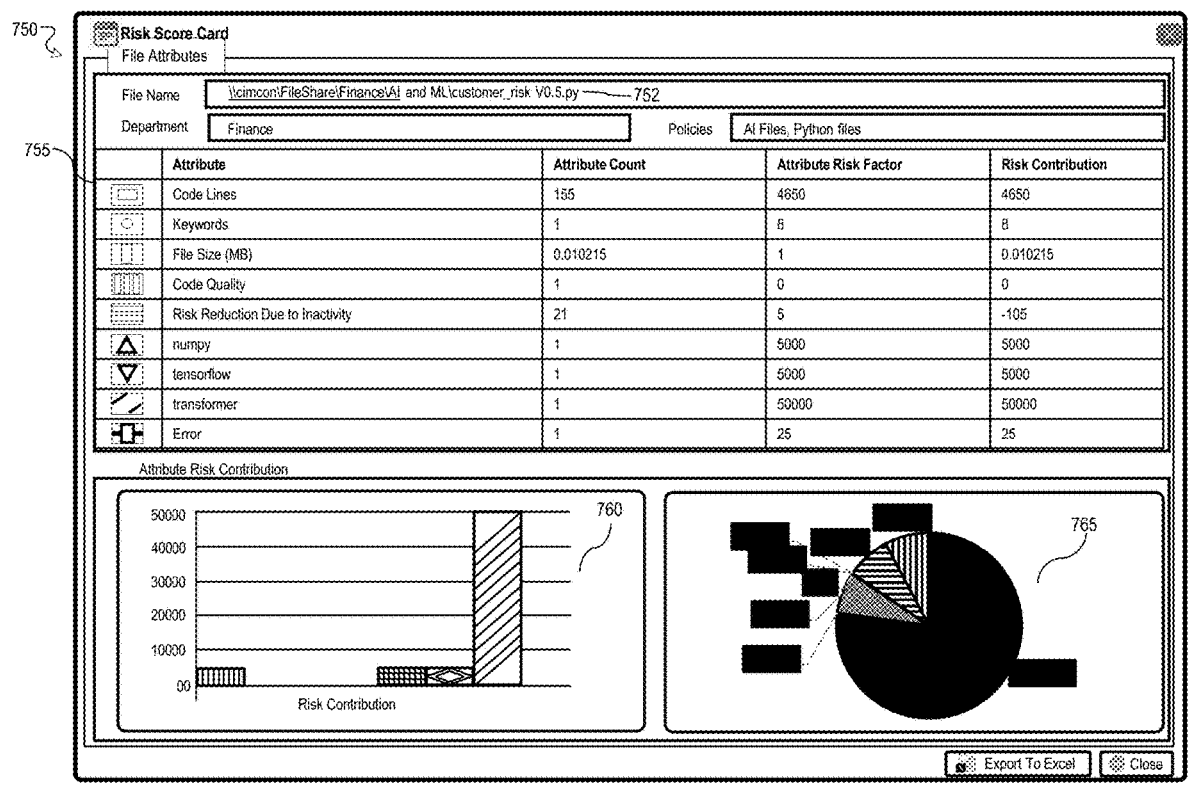

Referring now to FIGS. 5A-5B, the example user interfaces depict a risk score configuration display that can be used to configure a risk assessment of a candidate file and a corresponding risk scorecard illustrating the results of the risk assessment. In some implementations, the system 100 can allow a user to assign a risk weight to each attribute in order to calculate a customized aggregated risk score, e.g., by multiplying the risk weight with the number of instances of the attribute and summing. In particular, the single risk score can be used as a representative measure of risk for any number of files, e.g., 100, 1000, 1 million, that can facilitate the risk assessment process and any downstream tasks using the single risk score, e.g., as opposed to the set of risk attributes for each candidate.

The system 100 can provide the risk score configuration display 700 for a user to assign a value to each risk factor in order to calculate a measure of riskiness for a file, e.g., a corresponding risk score, based on a combination of user inputs and the results of the file scan. In some cases, the risk score configuration display 700 can also be referred to as a no-code configuration display since the display 700 allows a user to configure the risk score calculation using a user interface, e.g., without the need change or write code.

More specifically, the system 100 can allow a user to assign a corresponding risk score to each attribute identified from the file scan using the risk score configuration display 700, e.g., such that the user can make a determination of a relative importance of each attribute according to the particular scan being performed. In some implementations, the system 100 can additionally assigned a corresponding library risk weight, e.g., by providing a risk factor 740 for each of the libraries. In some cases, the risk factor can be informed by a security vulnerability database, e.g., the NIST database.

The system 100 can then use the weights to calculate a risk score, e.g., by receiving a risk weight parameter for each risk factor and multiplying the assigned value with the risk weight parameter. As an example, the system can calculate a weighted average of the attributes using the corresponding weights to determine the risk score. As another example, the system can receive a corresponding set of threshold values for each risk factor and compare the value for each risk factor to the respective threshold value in order to determine the risk score.

In the particular example depicted, a user is configuring a risk-score calculation for a finance repository 705 using a number of tabs. In the expanded Python tab 710, the user has assigned code quality risk weights 712-722 to each of the error categories corresponding with a code quality analysis, e.g., a weight of 50 for fatal errors 712, a weight of 25 for general errors 714, a weight of 1 716 for informational warnings, a weight of 5 for refactoring 718, a weight of 2 for convention warnings, and a weight of 0 for warnings 722. In this case, the user has decided to entirely remove one of the attributes from the risk score calculation, e.g., by assigning a weight of zero to remove the warnings 722 from the calculation.

After configuring the risk score configuration display 700, the user can elect to run the risk score calculation. In some implementations, the system 100 can output a risk score card display 750 that includes the determined risk score and associated data for each of the files. In the particular example depicted, the system provides a risk score card for the file 752. In this case, the risk score card display 750 includes a risk attribute table 755 to identify how each attribute contributes to the risk score, e.g., by providing a count of the attribute, the risk factor, e.g., the assigned weight, and overall contribution to the risk score.

In some implementations, the system 100 can also provide one or more visualizations in the risk score card display 750 to further illustrate the results. For example, the system 100 can provide a risk contribution bar graph visualization 760 or a pie chart visualization 765. In the particular example depicted, the visualizations 760 and 765 are interactive, e.g., hovering over each bar in the bar graph 760 or portion of the pie chart 765 can display information about the corresponding attribute that contributed to the risk score.

The system 100 can determine a subset of the candidate files as high-risk based at least on the risk factors or the risk score. In some implementations, the system 100 can use the determined risk score to determine whether the file meets certain criteria for further monitoring, e.g., using a risk policy, or can determine to maintain the file in the inventory register 145.

As an example, a user can use the results of the risk score calculation to determine which files to manage further. In some cases, the system 100 can provide an option for a user to elect to maintain a file, e.g., after viewing the corresponding risk score card display 750, the user can select an option to maintain a file under a policy. As an example, the user can configure one or more policies for monitoring the file by specifying a set of rules as the policy. In other cases, the system 100 can be configured to automatically maintain files with risk scores greater than a certain threshold or files with particular attributes greater than a certain threshold level.

Figure 5C:
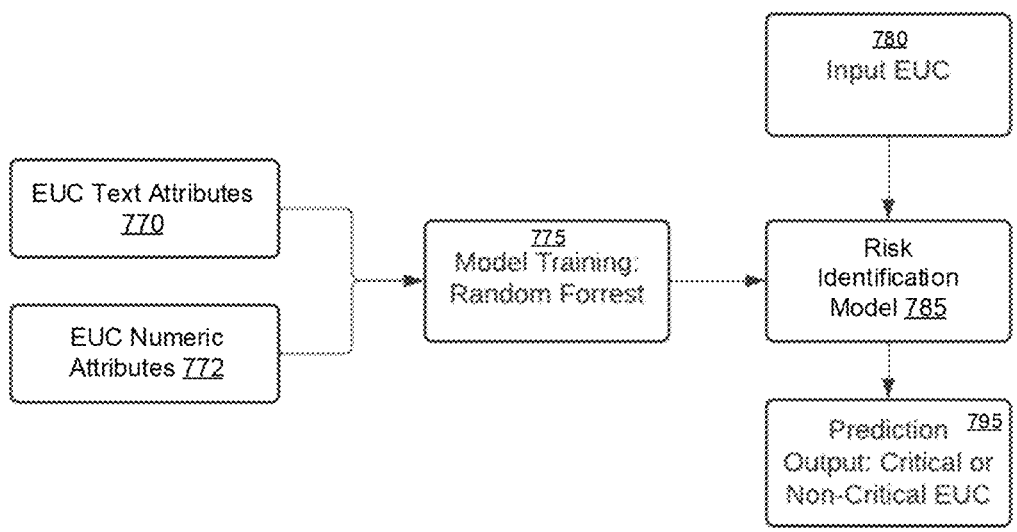
FIG. 5C is a schematic diagram showing the use of an AI model that learns from previously assigned high-risk files in the inventory to predict new high-risk files.

In another implementation, the system 100 can employ a risk identification model configured to predict a measure of risk for a set of candidate files. As depicted in FIG. 5C, the system can maintain a risk identification model 785 that can process an input 780 including end-user computing features, e.g., the risk factors and corresponding scores as determined by a file scan, to generate an indication of whether the candidate file is high-risk. In the particular example depicted, the prediction output 795 is a measure of criticality for the end-user computing features processed as input 780, e.g., a risk label, risk indicator, or risk value as an indication of the measure of risk for the candidate represented by the input 780.

As an example, the risk identification model 785 can be a rules-based model, e.g., the system can compare the input 780 to a set of preconfigured rules that specify conditions for high, medium, and low risk files and can evaluate a measure of riskiness based on the rules the candidate satisfies.

As another example, the risk identification model 785 can be a machine learning model, that can be configured to process the input 780 to generate a prediction output 795, e.g., as depicted. In this case, the system 100 can store file metadata indicating whether or not a user elected to monitor the file as a ground truth label that can be used for training the risk identification model, e.g., using the data maintained in the inventory register 145.

More specifically, the system 100 can train the risk identification model 785 using a training subsystem. In this case, the training subsystem 775 trains the risk identification model 785 as a binary classification model based on the random forest algorithm. In particular, the system 100 can train the risk identification model 785 using a machine learning algorithm on an objective function that includes a discrepancy between a predicted risk label and a ground truth risk label. For example, the risk identification model 785 can be trained with a training dataset including end-user computing (EUC) textual attributes 770 and EUC numeric attributes 772, e.g., attributes determined from previously identified and assessed candidate files from the inventory register 145 or another database. More specifically, the risk identification model 785 can be trained using a data set of previously identified and assessed candidates that were progressed and stored in the inventory register 145.

In some cases, the training data can additionally include the results of one or more tests run on files using the AI testing module 180. In particular, the results can be maintained in the inventory register 145 as data relating to model behavior, compliance, or risk status of a file that has had a test run on it. In this case, the model behavior refers to one or more of the bias, fairness, interpretability, validity, reliability, or robustness to data drift metrics of a model that is included in the file, e.g., as determined by the results of a test run using the AI testing module 180.

For example, in the case that a user has elected to run an AI bias test, the system can store the results of the AI bias test, e.g., data that indicates a measure of riskiness and compliance of the file based on whether the results of the model included in the file are biased as attributes, in the inventory register 145. More specifically, the data relating to model behavior, compliance, or risk status of a file can be stored each time a test is run. In this case, the risk identification model 785 can use the bias data from each of the AI bias tests run to learn which aspects of a file contribute to the bias of the model. Similarly, for other tests run using the AI testing module 180, the system can store the results in the inventory register 145 for training the risk identification model 785.

Figure 6A:
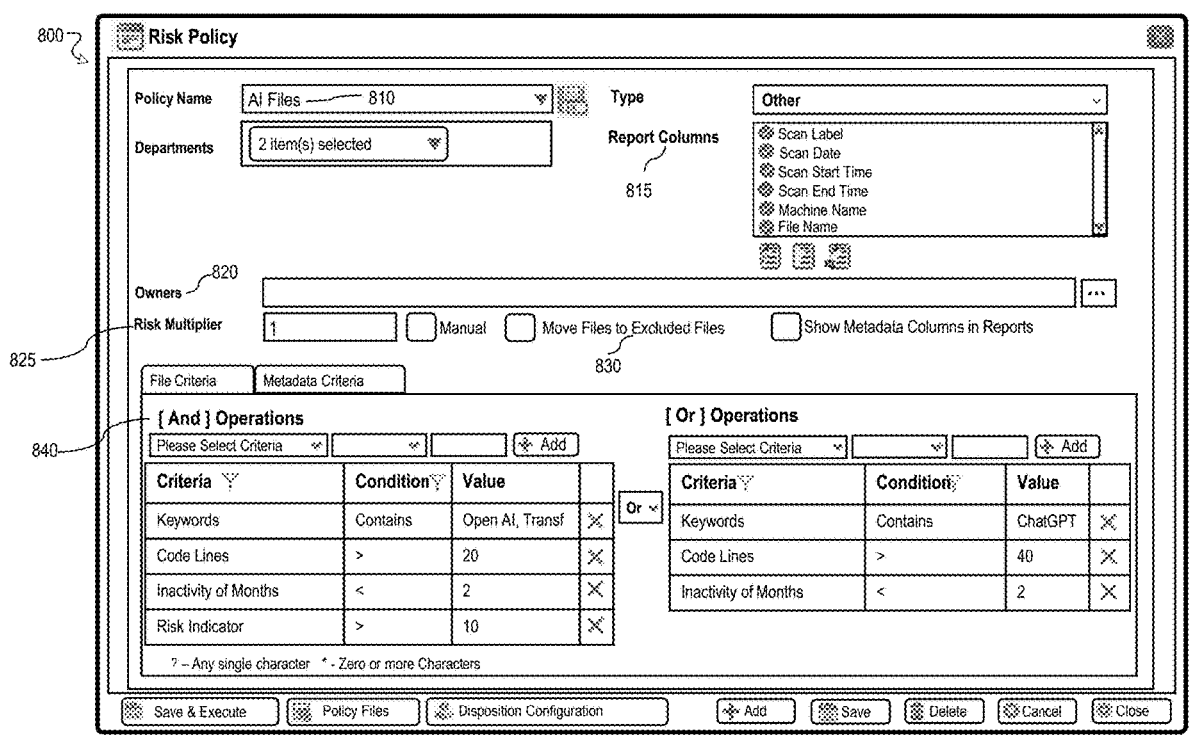

Referring now to FIGS. 6A-6B, example user interfaces depict a distinct risk policy configuration display that can also be used to configure the management of files. In some implementations, a user can configure a risk policy using a risk policy configuration display 800. In some cases, the risk policy configuration display 800 can also be referred to as a no-code configuration display since the display 800 allows a user to configure the risk score calculation using a user interface, e.g., without the need change or write code. In this context, a risk policy is a configured rule for a scanned file that can specify one or more actions the system 100 can take for the file.

The user can use the risk policy configuration display 800 to configure a policy 810 for one or more files, e.g., an identified group of files in a particular file repository. For example, the user can select one or more report columns for the output of the risk policy using a report column selector 815. In this case, the system can output a report after enacting an action of the policy. As an example, an action can be marking a file for further review by an identified owner of the file. In this case, the system 100 can provide an owner assignment field 820, e.g., such that a user can designate an owner of the file that can access the report. In this case, the designated owner can be presented with a checkpoint for further verification, e.g., the system 100 can require that further verification be necessary. In some cases, the verification can be a part of advancing a workflow.

In some embodiments, the system 100 can also provide a selection option, e.g., the radio buttons 830, for a user to select from one or more maintenance options for the file. For example, the options of the radio buttons 830 can include manually maintaining the file, excluding the file from further monitoring, or showing metadata columns in generated reports.

In some embodiments, the system 100 can also provide the user with options for configuring various aspects of the generated report. For example, the system 100 can provide a risk multiplier field 825 for a user to specify a specific risk multiplier for a file. As an example, the user can specify a risk multiplier to either upweight or downweight the risk as calculated in a previous risk score calculation as part of the report. As another example, the system 100 can allow a user to define operations on the files as part of the policy using a business operation calculator 840, e.g., a business operation calculator. In some cases, the business calculator can allow for a user to query a database, e.g., without the knowledge of SQL or No-SQL, by selecting operators and specifying how to use them in a statement. For example, configurable rules can include both arithmetical (e.g., less than, greater than, equal to, contains) and logical (e.g., AND, OR) parameters allowing for complex rules to be defined.

The system 100 can also provide a disposition configuration display 850 to enable a user to take a maintenance action, e.g., by selecting a radio button 865 for a particular policy 860. For example, files can be investigated (e.g., marked for further review), moved to another folder, deleted, or retained using a maintenance action. The system 100 can also allow for the file to be automatically added to inventory by selecting a box 870, e.g., a user can specify that a file should be maintained, e.g., even if the determined risk score of the file is considered to be low risk. In the case that a user elects for a file to be investigated, the system 100 can allow for a user to configure the cadence at which the file is monitored, e.g., by specifying an allowable time elapsed since the last scan in a field 885, e.g., using a number of days after scan date. For example, the system can be configured at the cadence of a number of hours, weeks, or months.

As another example, similar files can be grouped together, e.g., using a group file copies checkbox button 875. In this case, the system 100 can group copies or versions of a file in the subset of candidates as a single candidate in the inventory. FIGS. 7A-7B demonstrates example user interfaces for aggregating like files into copy groups for further management. For example, in the case that a user selects the group file copies checkbox button 875 in FIG. 8, the grouped files can be viewed using a copy group management display 900.

The system can present the user with a copy group management display 900 to allow a user to manage copy groups. For example, the system 100 can be configured to perform one risk evaluation for each copy group, e.g., since the files are similar or the same, using the copy group management display 900. In some embodiments, the copy group management display 900 can include an indication of file repository 905 and a table 910 that displays the group names 920 assigned to each file grouping.

More specifically, grouping similar files together can streamline the risk assessment process and reduce computational resources by providing an option to group similar files together for assessment. For example, files in a group can be accounting or banking statements, which are all unique, but not different in terms of the content they contain. In this case, a user can elect to manage multiple copies of a balance sheet, income statement, and cash flow statement within the same copy group, e.g., since the overall content of what the file represents is the same, even though every spreadsheet is unique.

In some embodiments, the system 100 can display a copy group list display window 950 upon receiving an indication that a user has selected a copy group, e.g., for viewing. In this case, the copy group list display window 950 includes information about the quarterly cash flows copy group list 960. The user can navigate between copy group list display windows and the copy group management display 900 to manage the copy groups.

Referring back to FIG. 1, the system 100 can allow a user to add a discovered file to the inventory register 145, e.g., using the inventory module 140. In particular, the system 100 can add the file to the inventory register 145 for case of tracking, e.g., by maintaining a register of high-risk files for further evaluation, risk management, and reporting. More specifically, the system 100 can be configured to retain a selected subset of candidate files for further assessment, e.g., based on the calculated risk score or policy assignments. The system 100 can be configured to maintain a record of the file as well as information that pertains to the file's lifecycle in the inventory register 145.

Referring back to FIG. 1, the system 100 can allow for the addition of information to the inventory register 145 or another database using a form, e.g., a metadata form created using a metadata form configuration module 170. In some embodiments, the metadata form configuration module 170 can be configured to generate a form that can be provided to a user to add information pertaining to one or more files to the inventory register 145. In this case, the metadata form configuration module 170 can add data entered into the form to the inventory register 145 or to another database.

Referring back to FIG. 1, the system 100 can log any additional testing performed on a candidate file. In some implementations, the system 100 can enable a user to perform one or more automated tests on a file. As an example, the system 100 can identify one or more tests based on the type of file, e.g., a spreadsheet, text, or code-containing file, and can provide the options to the user for selection. For example, the system can identify one or more of a fairness assessment, interpretability assessment, validity assessment, reliability, and data drift assessment.

Figure 8A:
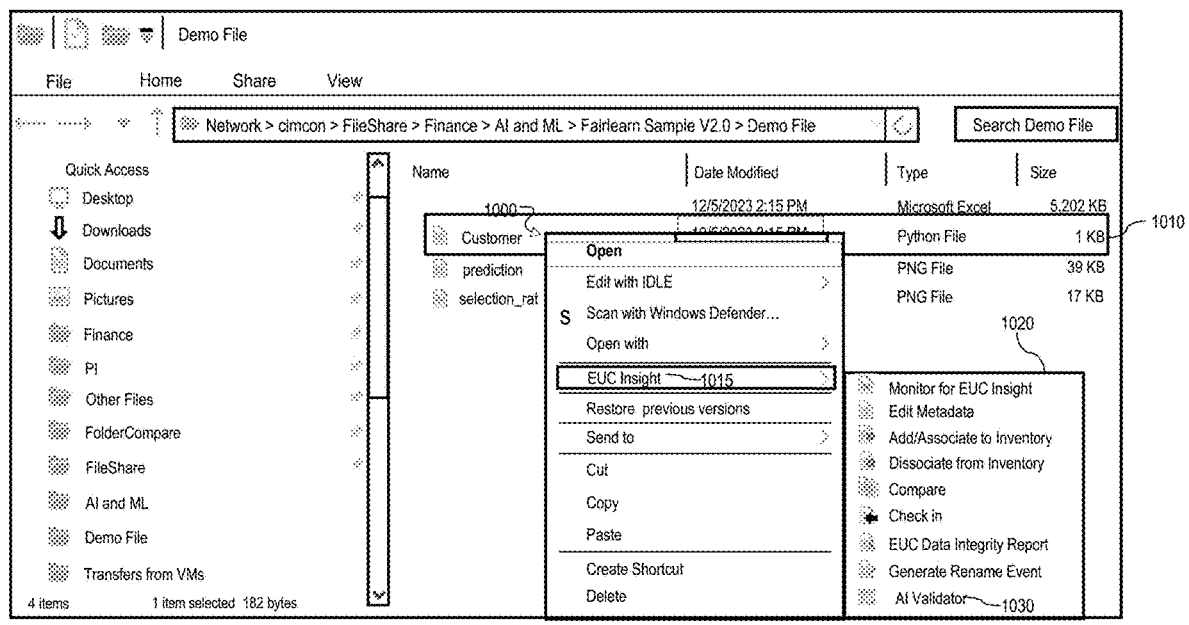
FIGS. 8A and 8B illustrate example user-interfaces for evaluating files implicating AI processes an example of test options, and an example of test results for a sample bias testing run, respectively.
Figure 8B:
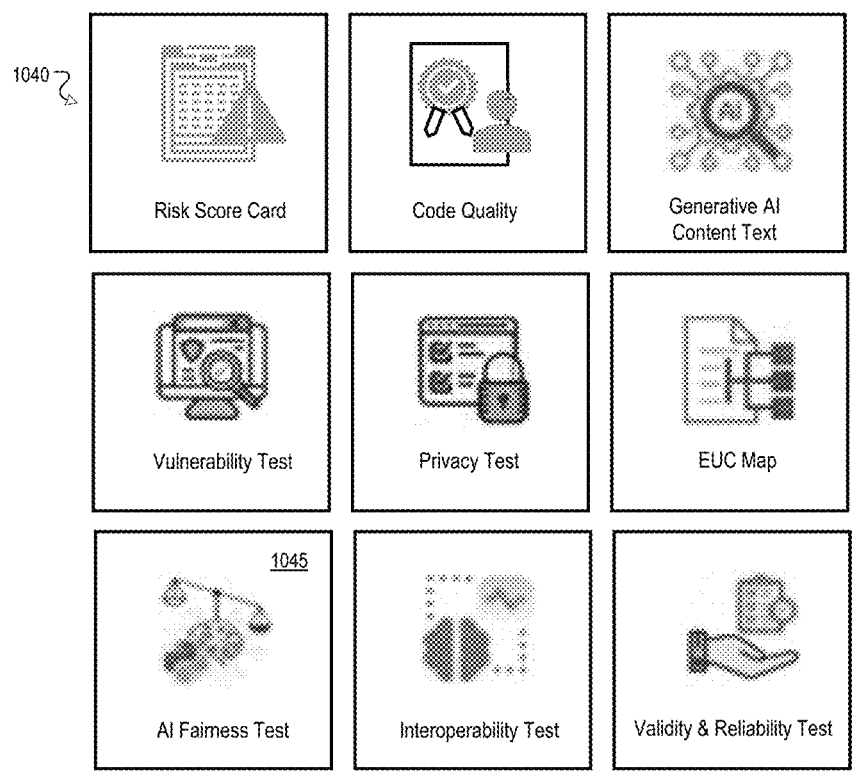

Referring now to FIGS. 8A-B, example user interfaces illustrate an example of further evaluating files containing AI processes using automated testing in FIG. 8A. FIG. 8B depicts example testing options. As an example, the system can perform the automated testing using the AI testing module 180.

For example, as depicted in FIG. 8A, the system 100 can provide a customized file system option as part of the drop-down menu 1000 a user receives when clicking, e.g., right or control clicking on a file, e.g., the file 1010. The file system option can provide options for evaluation using one or more assessments.

In some implementations, the system 100 can provide an option 1015. In the case that a user selects the option 1015, the system 100 can present the user with suboptions, e.g., both generic suboptions and suboptions associated with the particular file type, e.g., in a second dropdown menu 1020. As an example, the system 100 can provide generic options to further monitor the file, edit metadata, add or remove to the inventory register 145, compare versions, check in the file, generate a rename event, etc. As another example, the system 100 can provide options associated with the particular file type. In this case, since the file 1010 is a code-containing file, e.g., a python file, the system 100 can include an option to open the AI validator option 1030, which is a software suite that provides various tests that a user can select to be run on a file.

In particular, in response to selecting the AI validator option 1030, the system 100 can present the display 1040, as depicted in FIG. 8B. In this case, the system 100 can identify one or more automated tests to perform on the file using the AI testing module 180, e.g., based on a corresponding set of attributes that include an attribute indicative of AI usage. For example, the system 100 can identify one or more automated tests and present test options to the user including risk score card assessment, e.g., as depicted in FIG. 5B, a code quality analysis, a generative AI content assessment, e.g., to determine whether a file was generated in whole or in part using a generative AI model, a vulnerability assessment, a privacy test, an end user map, an AI fairness assessment, an AI interpretability assessment, and a validity and reliability assessment. Similarly, other assessments related to explainability/interpretability, data drift, etc. can also be included in the display 1040 with automated test options.

As an example, the AI fairness assessment can break down the performance of an algorithm by a sensitive feature such as class protected by law and compare if there is a significant difference in performance across the classes. As another example, the AI interpretability assessment can include feature importance analysis, sensitivity analysis, or partial dependence analysis, e.g., to validate the relationship between the input and predicted output generated using the file. As yet another example, the AI validity assessment can include cross-validation, holdout validation, or comparative analysis, e.g., to assess generalization of the output of the file based on unseen input data. As a further example, the AI reliability assessment can include reproducibility testing, robustness evaluation, or adversarial testing, e.g., to validate the consistency of the output of the file. As yet a further example, the data drift assessment can include a temporal stability analysis, feature distribution comparison, or prediction drift monitoring, e.g., to evaluate the output of the file based on gradually changing input data over time.

The system 100 can also store data relating to the test results in the inventory register 145. In particular, the system 100 can maintain test data as attributes, e.g., text or numeric attributes, related to the file that can be used to train a machine learning model configured to evaluate one or more of model behavior, compliance, or risk status. For example, the system 100 can use data relating to test results run using the AI testing module 180 as part of the dataset that is used to train the risk identification model 785, as described in FIG. 5C.

Referring back to FIG. 1, the system 100 can be configured to perform a workflow for a particular file, e.g., using a workflow module 160. In this context, a workflow includes a specified sequence of actions, and checkpoints for a file that enables a user to log actions on a file in a controlled manner based on one or more tasks. For example, the checkpoints can correspond with links that establish the sequence of tasks in the workflow, e.g., the order of the tasks in the workflow.

The system can enact the specified sequence of actions in the workflow in response to a detected change in the file to which the workflow pertains, e.g., according to the current task, using the workflow module 160. More specifically, after each task is completed, the system 100 can enact the next checkpoint task to ensure that proper approval and monitoring is received. In some cases, the system 100 can prevent the workflow from advancing by locking access to the file to which the workflow pertains until the checkpoint is addressed.

Figure 9:
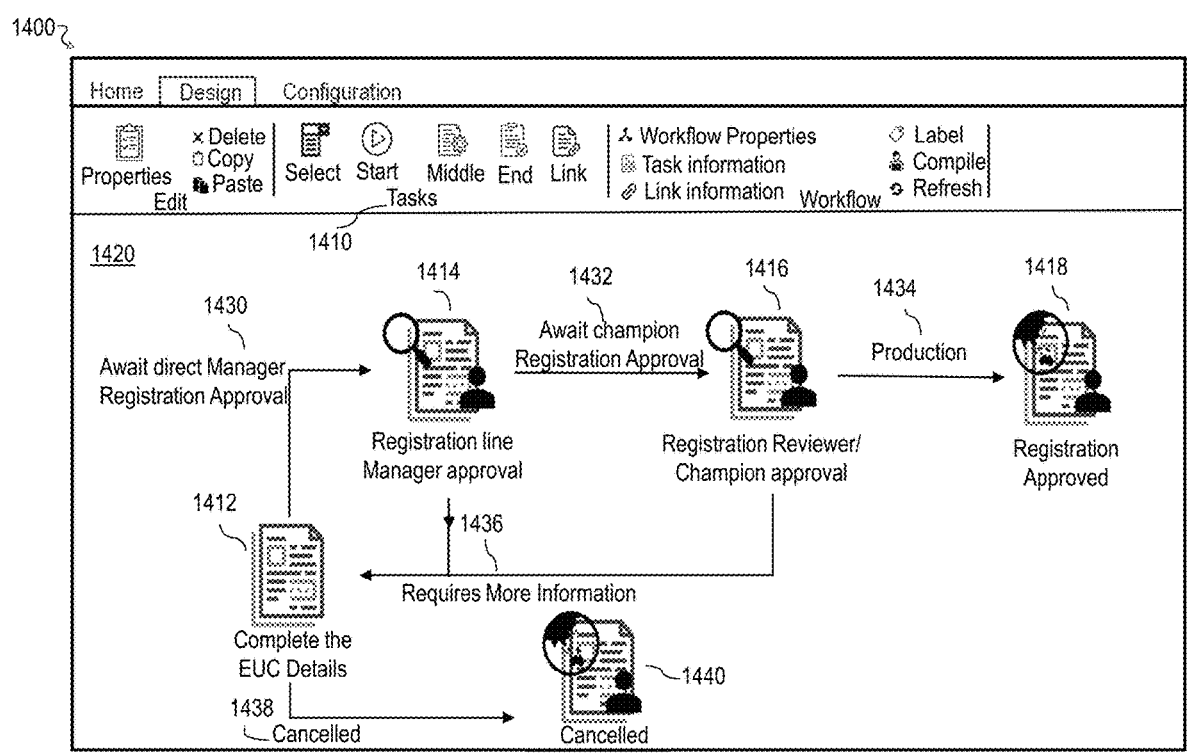
FIG. 9 depicts an example of a user-interface that can be used to configure a workflow specifying a sequence of tasks with respect to a file in the inventory using the workflow module of FIG. 1.

In some embodiments, the workflow module 160 can provide a display that allows a user to configure a workflow by arranging task icons in a particular order. FIG. 9 depicts an example workflow configuration display, e.g., that can be used to configure a workflow specifying a sequence of tasks with respect to a file in the inventory using the workflow module 160 of FIG. 1. In some cases, the workflow configuration display 1400 can also be referred to as a no-code configuration display since the workflow configuration display 1400 allows a user to configure a workflow using a user interface, e.g., without the need change or write code.

Now, referring to FIG. 9, the system 100 can provide a workflow configuration display 1400 to allow a user to configure a workflow for one or more files. For example, the system 100 can provide a drag-and-drop graphical user interface that allows a user to select a task icon 1410 representing a certain task and to position the task icon 1410 in a relative order with respect to one or more other task icons on a workflow representation display 1420. More specifically, the workflow representation display 1420 can enable a user to set up a workflow by connecting the tasks using one or more links to establish the sequence of tasks in the workflow. For example, the task icons 1410 can include a start task, middle task, end task, and link, e.g., checkpoint between tasks.

In the particular example depicted, the user is configuring a workflow for approval of an entered form that includes end-user computing (EUC) details by dragging-and-dropping task icons 1410 and arranging the task icons 1410 into an order using links. In this case, the workflow can include the completion of EUC details 1412, approval of the EUC registration by a different user, e.g., the direct manager 1414 and the registration reviewer 1416, a final task 1418, e.g., a task that indicates final approval as a completion, and a cancellation 1440 of the started workflow of the workflow representation display 1420, e.g., in the case that the EUC details are not approved. In the case that the workflow is cancelled, the system 100 can be configured to restart the workflow back at the first task in the workflow, e.g., in response to the completion of EUC details a subsequent time.

As an example, the checkpoints involved in the workflow depicted include awaiting approvals, e.g., the approval checkpoints 1430 and 1432, going into production 1434, requiring more information 1436, or getting cancelled 1438. Each checkpoint is placed in accordance with its role in the sequence of tasks, e.g., in order to advance the workflow. In some cases, the user can select the type of link from a set of options provided for the link. For example, the system 100 can provide different types of links based on the type of tasks being connected for user selection. In other cases, the system 100 can infer the type of link between two tasks. For example, the link between the completed end-user computing (EUC) details task 1312 and the line manager approval task 1314 can be inferred as awaiting direct manager approval. As another example, an intermediate disproval in the sequence of tasks, can be inferred as requiring more information 1436.

Figure 10A:
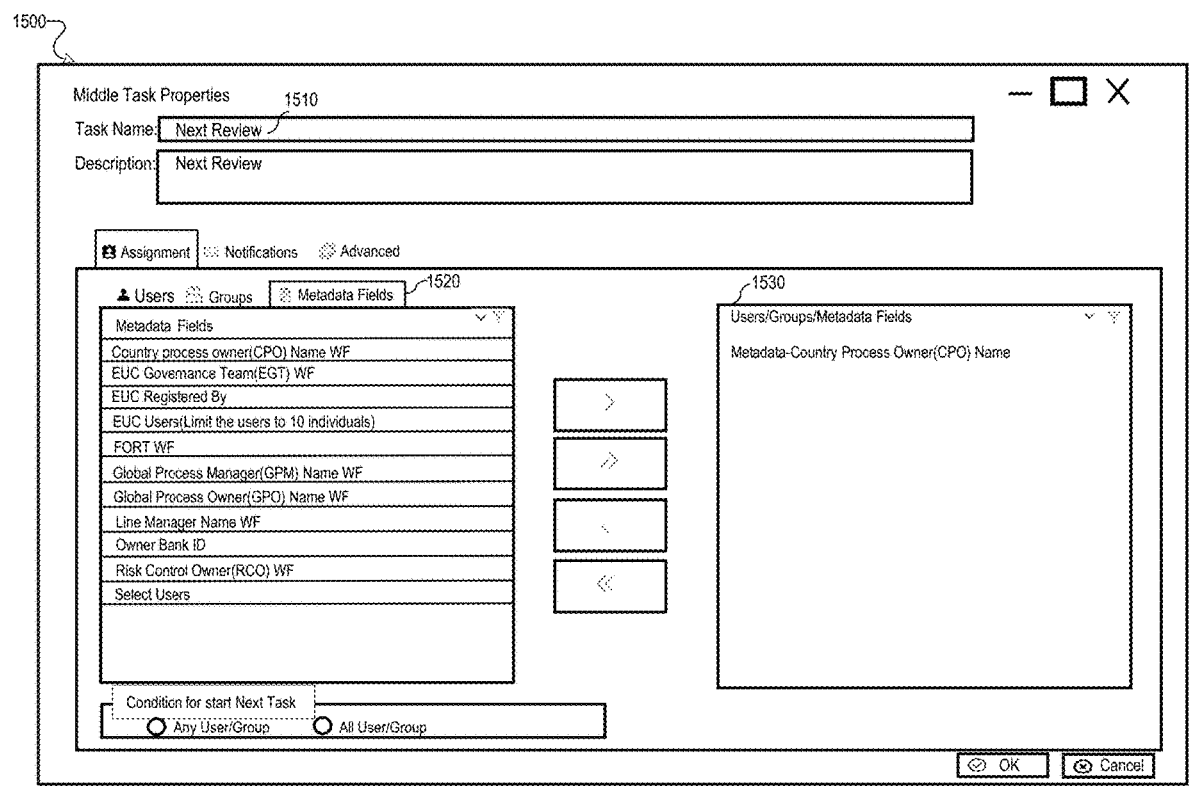

Each task can be assigned to a user, e.g., to generate information as part of an audit trail. In some cases, the completion of the task can depend on the user filling out a form to log information regarding to the task. FIGS. 10A-10B illustrate example user interfaces for the assignment of roles, e.g., for a specific approval of a workflow task. As an example, a user, e.g., an administrator, can fully configure the task in the workflow using a task property display 1500, which can include details about the task, e.g., the name, description, owner look-up for assignment 1520, and one or more users assigned as owners 1530 of the task. In this case, the system can receive a task assignment from a field on the display 1500 that automatically allocates a field on a form that will be provided to the assigned owner 1530.

In the particular example depicted, a user is assigned a review task, e.g., the next review task 1510. In this case, the administrator has used the metadata fields tab to facilitate owner look-up for assignment 1520, e.g., the administrator has assigned the line manager as the owner 1530. In other cases, the administrator can identifier the user from a list of users, e.g., using one or more desired users' names, or from an established group of users, e.g., a defined permissions group. In some cases, the task can be assigned to a configured field in the inventory form, e.g., rather than a static user or group. In other words, a configurable workflow with corresponding tasks can be created using a no-code configuration display, and the workflow task can be assigned to a field value of a configurable inventory or meta data form that is created using the configuration display, for ultimate flexibility and convenience of users.

In some embodiments, the workflow configured can specify the sending of notifications to one or more of the identified users associated with the workflow, e.g., to approve a file in order to advance the workflow. As an example, the system 100 can provide an approval checklist configuration display 1550 to allow a user to configure a checklist for the user assigned to the specific task, e.g., the system 100 can require that the user fill out and submit the checklist in order to complete the task assigned to them.

For example, the approval checklist configuration display 1550 can include a question entry 1560 portion and a question table 1570 that includes each question entered into the approval checklist, e.g., using the question entry portion. In the particular example depicted, the approval checklist configuration display 1550 includes a question input portion 1562, an indication of what the correct answer is 1564, e.g., an answer that can enable the workflow to advance to the next task, an indication of whether or not the question needs to be answered 1566, and a default answer 1568. In this case, the administrator has selected that the necessity of the correct answer is mandatory, e.g., that the workflow cannot advance unless the user enters an answer for the question.

In some implementations, each question entered can be configured for each task, e.g., as depicted in the question table 1570. For example, the system can process the question table 1570, e.g., after the administrator saves the questions using the save button 1580, to generate a corresponding approval checklist that the user to whom the task is assigned can fill out, e.g., in order to advance the workflow. Questions can be set to default values, can be made mandatory in which case the task cannot be completed without entering a value for the questions, or even verified to be correct, e.g., if all audit trail generated using the change management module 150 have been verified or not.

Referring back to FIG. 1, the system 100 can be configured to monitor a file for change, e.g., using a change management module 150. The change management module 150 can be configured to monitor one or more files automatically for changes. In response to a detected change, the system 100 can derive data from the change, e.g., metadata describing a modification, e.g., the date and time of modification, author of modification, type of change, old value, new value, a description of the change, reason for the change, etc.

In some cases, the system 100 can log audit trail data in the inventory register 145, e.g., to maintain all system-derived information pertaining to the file in one location. As an example, the system 100 can store and analyze user behavior data for exceptions, such as a user modifying a file at a time when the user usually does not interact with the file, a user making a type of change they have never made before. As another example, the system 100 can store and analyze the types of modifications being made to a file.

In some implementations, the change management module 150 can determine a measure of risk for the detected change, e.g., using a machine learning model with any appropriate architecture configured to process data relating to the change to predict a measure of risk based on the detected change. For example, the system 100 can be configured to train the machine learning model using logged data relating to previously detected and assessed changes by updating the respective values of parameters of the machine learning model.

Figure 11:
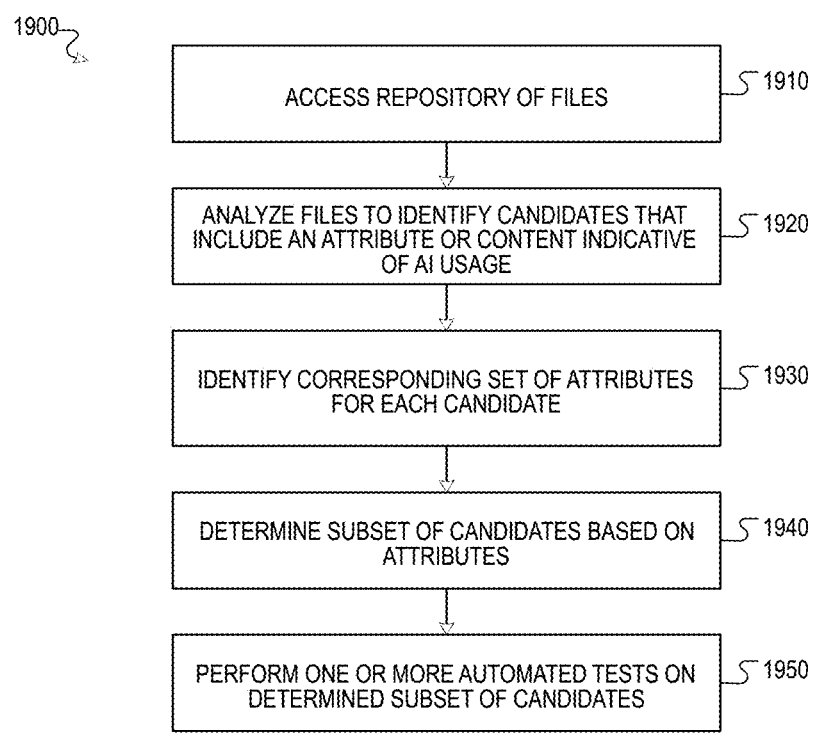
FIG. 11 is a flow diagram of an example process for performing an automated risk assessment of a repository of files, e.g., using the risk management system of FIG. 1.

FIG. 11 is a flow diagram of an example process for performing automated tests on one or more candidate files. In some implementations, the process 1900 is executed by a system of one or more computers potentially located in a distributed configuration. For example, a risk management system, e.g., the risk management system 100 of FIG. 1, appropriately programmed in accordance with this specification, can perform the process 1900.

The system can access a repository of files (step 1910). In some embodiments, the system can access the repository of files in a first scan in accordance with a set of one or more configurable scanning parameters. In this case, the system can identify one or more files in the first scan according to the configurable scanning parameters. In some cases, the system can use the results of the first scan in a second scan, e.g., according to a second set of configurable scanning parameters. For example, the second set of scanning parameters can include one or more of target folders, target drives, file types, file age, file compression technology, scan depth, and keywords.

The repository of files can be stored on one or more computer-readable storage devices, e.g., a laptop, a desktop computer, a tablet, or a smart phone, a remotely-accessible file system that can be accessed using a network, e.g., the internet, an intranet, etc., or a cloud repository file system etc. In some cases, the system can be configured to access a subset of the repository of files, e.g., files in a particular directory in the repository, files including a specified keyword, or files with a particular file extension, e.g., a .py, .xlsx, .xlsm, .exe, etc.

The system can analyze the files to identify one or more candidate files that potentially include an attribute or content indicative of AI usage (step 1920). In some embodiments, the system can identify one or more attributes of the file, e.g., using one or more of file metadata, file location, or file contents. For example, the system can identify a file name, file type, attributes specific to the file type, one or more file authors, and organizational information pertaining to the file. As another example, the system can identify one or more dates of modification, a date of last access, and an author associated with the last access. As yet another example, the system can determine a file size, identify the location of the file in the repository (with respect to a file hierarchy), or determine security rights of the file in the repository.

As a further example, the system can identify one or more attributes or content indicative of AI usage in the file. In this case, the system can identify the potentially AI-generated files using a file extension, a reference to a generative AI tool, library, algorithm, keyword, etc., or a number of lines of code. In another case, the system can identify files that pertain to a certain subject or that were modified by a certain user or groups of users.

The system can identify a corresponding set of attributes for each candidate (step 1930). For example, the system can determine a set of attributes using file metadata. In some cases, the system can identify the presence of sensitive personal identifying information or based on security permissions for the file. As another example, the system can identify attributes by performing a code quality assessment to detect one or more types of errors or warnings and vulnerabilities associated with each version of the identified library versions in a code-containing file.

As yet another example, the system can evaluate associated input and output dependencies including libraries, files, or import modules for candidate files. In some implementations, the system can display a visual representation of the identified input and output dependencies for each candidate on a graphical user interface. For example, the visual representation can include an interconnected AI map of one or more objects representing a sequence of inputs to outputs in accordance with the dependencies at a specified-hierarchy level. As another example, the objects can have characteristics that are indicative of dependency information including a type of dependency, a scan status, and a type of dependency. In this case, the system can allow a user to view the candidate, add the candidate to inventory or monitoring, assign the candidate to a policy categorization, or remove the candidate from future scans, e.g., through an interaction taken on the graphical user interface.

The system can determine of subset of candidates based on the attributes (step 1940). For example, the system can identify a subset of candidates based on a risk score for each candidate determined using the attributes. As another example, the system can assign a label to each candidate using a calculator engine configured to enact one or more arithmetical and logical operations as a calculation on the candidates based on the corresponding set of attributes. In some cases, the system can allow for the grouping of copies of a file as a single candidate or versions of a file as a single candidate.

In some embodiments, the system can assign a risk weight to each attribute, determine a number of instances of each attribute, and multiply the risk weight with the number of instances of the attribute to determine an aggregate risk score for the candidate as the risk score. In some cases, the system can additionally receive one or more threshold values indicative of a level of risk and can compare the risk score of each candidate to each threshold value to determine the level of risk for each candidate. In some embodiments, the system can calculate a percentage of risk contribution for each attribute and can display the percentages in a risk score card that includes a visual representation of the percentages on a graphical user interface.

As another example, the system can determine the subset of candidate using a risk identification model. In some cases, the risk identification model can be a machine learning model that is configured to process a set of file attributes for each candidate to generate an indication of whether the candidate is a high-risk candidate. In this case, the system can train the risk identification model on a dataset of previously identified and assessed candidate files, e.g., by predicting the subset of candidates that are high-risk using the risk attributes of the training data set and minimizing a discrepancy between predicted indications and ground truth risk indications form the training data set.

The system can then perform one or more automated tests on the determined subset of candidates (step 1950). In some embodiments, the system can enact one or more actions to the subset of candidates based on an assigned label. For example, the system can retain the subset of candidates for further assessment. As another example, the system can delete the subset of candidates from the repository, move the subset of candidates to a new location in the repository, or add the subset of candidates to a maintained file repository. As yet another example, the system can start a workflow using a pre-built workflow template. As a further example, the system can identify and perform one or more automated tests on the subset of candidates based on the assigned label.

As a further example, the system can perform one or more of an automated fairness assessment, interpretability assessment, validity assessment, reliability, and data drift assessment. In this case, the system can add results of the one or more automated tests in an inventory record. In some cases, the system can start a workflow based on a result of the one or more automated tests or send a notification to one or more identified relevant users based on a result of the one or more automated tests.

Figure 12:
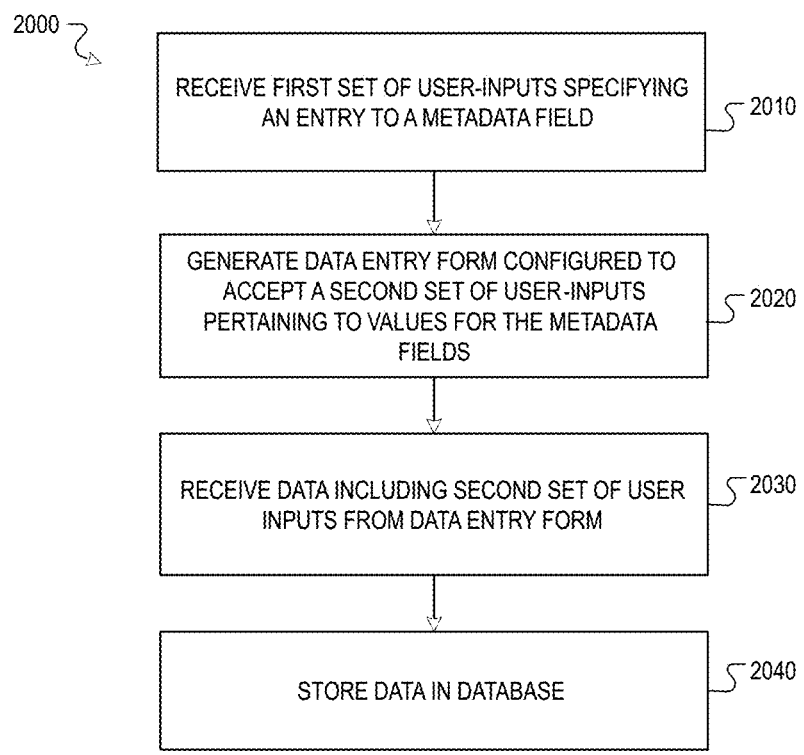
FIG. 12 is a flow diagram of an example process for configuring a form for data entry into a database, e.g., using the risk management system of FIG. 1.

FIG. 12 is a flow diagram of an example process or configuring a form for data entry into a database. In some implementations, the process 2000 is executed by a system of one or more computers potentially located in a distributed configuration. For example, a risk management system, e.g., the risk management system 100 of FIG. 1, appropriately programmed in accordance with this specification, can perform the process 2000.

The system can receive a first set of user-inputs specifying an entry to a metadata field (step 2010). For example, the system can receive the user-inputs through a user-interface that includes a user-configurable identification of a set of metadata fields. In this case, the system can receive the first set of user-inputs including multiple attributes pertaining to data to be stored in a database, where each user-input specifies, for each of the multiple attributes, an entry corresponding to at least a subset of the metadata fields. In some cases, one or more of the multiple attributes can be calculable fields that are derived from at least one of the metadata fields. In this case, the system can derive the calculable fields using a calculator engine configured to enact one or more arithmetical and logical operations to the at least one metadata field.

In some embodiments, the first set of user-inputs can include a corresponding set of color, placement, and containerization instructions relating to one or more of a tab and group layout, wherein the set of color, placement, and containerization instructions indicate at least a location and color of the first-set of user-inputs for display on the electronic display device. As an example, an administrator can configure the form using the first set of user-inputs.

The system can generate a data entry form configured to accept a second set of user-inputs pertaining to values for the metadata fields (step 2020). For example, the system can automatically generate the form based on the user-configurable identification of the set of metadata fields. In this case, the system can process the first set of user-inputs to display the one or more multiple attributes according to the corresponding set of color, placement, and containerization instructions received in step 2010.

The system can then receive data including the second set of user inputs from the data entry form (step 2030), and the system can store the data in a database (step 2040). For example, the system can receive the second set of user inputs from the display of the data entry form on an electronic display device. In the case that a database configured to maintain the data included in the second set of user inputs does not exist, the system can generate the database based on the first set of user-inputs.

Figure 13:
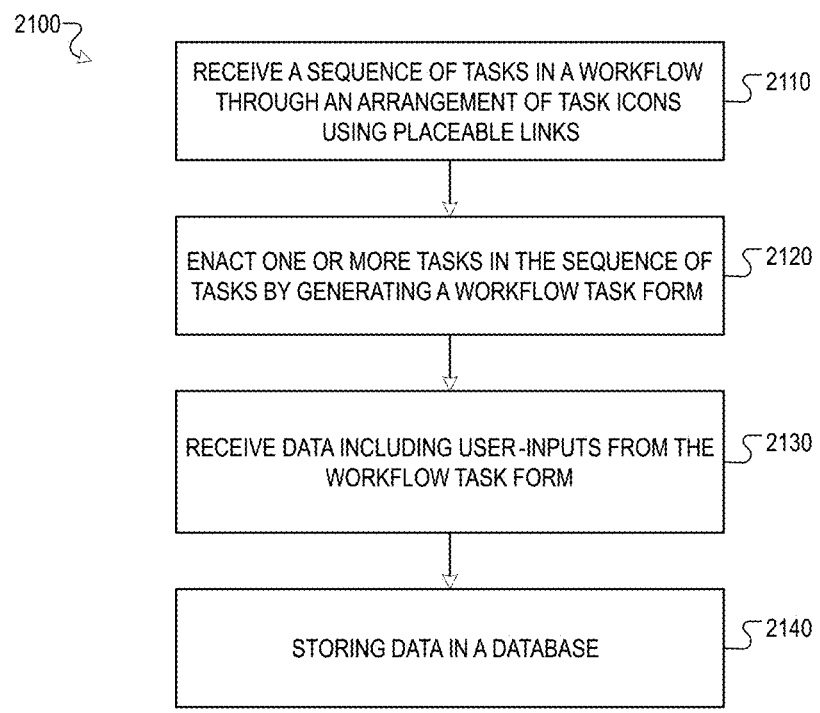
FIG. 13 is a flow diagram of an example process for configuring a workflow, e.g., using the risk management system of FIG. 1.
Figure 14:
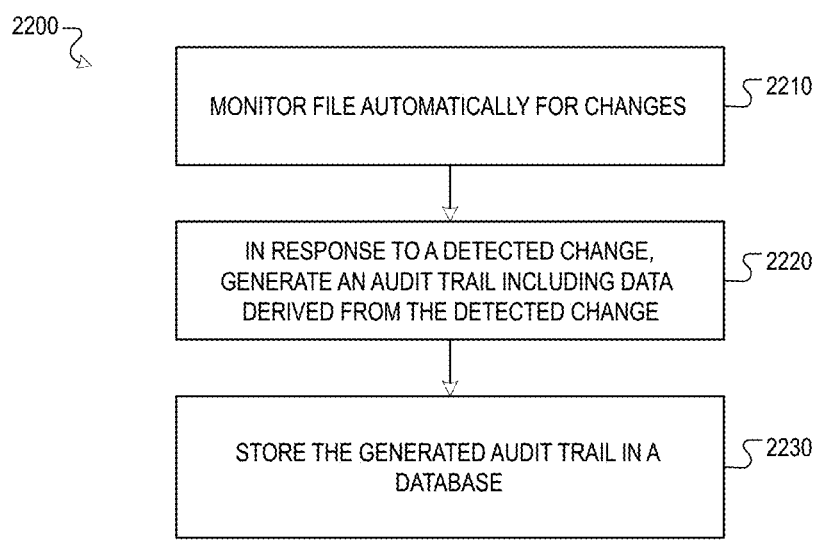
FIG. 14 is a flow diagram of an example process for monitoring a file for changes, e.g., using the risk management system of FIG. 1.

FIG. 13 is a flow diagram of an example process for configuring a workflow, e.g., using the risk management system. In some implementations, the process 2100 is executed by a system of one or more computers potentially located in a distributed configuration. For example, a risk management system, e.g., the risk management system 100 of FIG. 1, appropriately programmed in accordance with this specification, can perform the process 2100.

The system can receive a sequence of tasks in a workflow through an arrangement of task icons using placeable links (step 2110). For example, the system can receive the arrangement of task icons through a user interface including a set of task icons indicative of respective tasks and one or more placeable links for connecting pairs of task icons. In this case, the system can identify the sequence of tasks in the workflow through an arrangement of the task icons into an order using the one or more placeable links and can also receive an assignment of each task icon to one or more users or groups of users from the graphical user interface. In some embodiments, the one or more users or groups of users are dynamically assigned using a user-input value from a pre-configured metadata form.

The system can enact one or more tasks in the sequence of tasks by generating a workflow task form (step 2120). More specifically, the system can generate a workflow task form configured to accept one or more user-inputs pertaining to values associated with an outcome of the task in accordance with a user-configured identification of the one or more user-inputs solicited from the one or more users or groups assigned to the task for completion of the task. In some cases, the user-configured identification of the one or more user-inputs includes a set of questions indicated as required or optional for task completion.

The system can receive data including user-inputs from the workflow task form (step 2130), and the system can store the data in a database (step 2140). For example, the system can receive the data from the display of the workflow task form on an electronic display device. In some cases, the system can prevent the workflow from advancing based on one or more user-inputs.

FIG. 22 is a flow diagram of an example process for monitoring a file for changes, e.g., using the risk management system. In some implementations, the process 2200 is executed by a system of one or more computers potentially located in a distributed configuration. For example, a risk management system, e.g., the risk management system 100 of FIG. 1, appropriately programmed in accordance with this specification, can perform the process 2200.

The system can monitor a file automatically for changes (step 2210). For example, the system can receive an indication that one or more files should be monitored for modification or user behavior exceptions. As an example, modification can include insertion or deletion of content, e.g., including design modifications. As another example, user behavior exceptions can include a user modifying a file at a time when the user usually does not interact with the file or a user modifying a file that has not been modified in a particular duration of time.

In response to a detected change, the system can generate an audit trail including data derived from the detected change (step 2220). In some embodiments, the system can determine a measure of risk for the detected change. In this case, in response to an identification of a high-risk change, the system can identify and execute one or more tasks. For example, the system can alert one or more users or groups of users, start a workflow, or secure the file against further editing. As another example, the system can require verification of the detected change or highlight the change.

The system can store the generated audit trail in a database (step 2230). In some cases, determining the measure of risk for the detected change includes processing data relating to the detected change using a machine learning model to predict a measure of risk in response to the detected change. In this case, the system can train the machine learning model using the data logged in the database relating to previous detected changes and user actions taken in response to the detected change.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, the method comprising:
    accessing, by one or more computing devices, a repository of files stored on one or more computer-readable storage devices in accordance with a set of one or more scanning parameters, wherein at least one of the one or more scanning parameters is selected from a group consisting of target folders, target drives, file types, file age, file compression technology, scan depth, and keywords; and
    analyzing, by the one or more computing devices, files stored in the repository to identify candidates that are potentially generated at least in part using one or more artificial intelligence (AI) processes, wherein analyzing the files stored in the repository further comprises:
        identifying one or more attributes specific to the file type, wherein the one or more attributes include at least one of: a file extension associated with an AI tool, a reference to a generative AI tool, algorithm, keyword or folder associated with an AI tool, or outputs of an AI file; and
        identifying one or more keywords within the files;
    wherein each of the identified candidates includes at least one attribute among the identified attributes or at least one keyword among the identified keywords that is associated with AI usage;
    evaluating associated input and output dependencies of each of the identified candidates, wherein the associated dependencies comprise one or more of libraries, files, or import modules;
    generating a measure of risk for each of the identified candidates based on the corresponding attributes of the identified attributes or the corresponding keywords of the identified one or more keywords;
    determining one or more subsets of the identified candidates based on the respective measure of risk; and
    identifying or performing one or more automated tests or actions on each of the one or more subsets, wherein the one or more automated tests or actions comprises at least one of:
        performing one or more tests to evaluate one or more AI models associated with the subset;
        retaining the subset for further assessment;
        deleting the subset from the repository;
        moving the subset to a new location in the repository;
        adding the subset to a file inventory;
        starting a workflow using a pre-built workflow template;
        generating a visual representation of the input and output dependencies for each of the identified candidates in the subset and displaying the visual representation on a graphical user interface, wherein the visual representation comprises an interconnected AI map of one or more objects representing a sequence of inputs to outputs in accordance with the dependencies at a specified-hierarchy level; or
        grouping copies of particular files within the subset.

2. The method of claim 1, further comprising:
    identifying one or more files in a first scan in accordance with the set of one or more scanning parameters; and
    using results of the first scan in a second scan, wherein using the results comprises filtering the first set of one or more files identified in the first scan in accordance with a second set of one or more scanning parameters.

3. The method of claim 1, wherein identifying attributes specific to the file type further comprises, for each file, identifying one or more attributes of the file using one or more of file metadata, file location, or file contents, and wherein identifying the one or more attributes of the file using one or more of file metadata, file location, or file contents comprises, for each file:
    identifying a file name, file type, attributes specific to the file type, one or more file authors, and organizational information pertaining to the file;
    identifying one or more dates of modification, dates of last access, and an author associated with the last modification;
    determining a file size;
    identifying a location of the file in the repository with respect to one or more file system hierarchies in the repository;
    determining security rights of the file in the repository; and
    identifying one or more attributes or content indicative of AI usage in the file.

4. The method of claim 1, wherein the at least one attribute among the identified attributes or at least one keyword among the identified keywords that is associated with AI usage comprises at least one of: a reference to a library, a segment of code, or a number of lines of code.

5. The method of claim 1, further comprising identifying one or more libraries and library versions installed on the one or more computer-readable storage devices.

6. The method of claim 5, further comprising identifying vulnerabilities associated with each version of the identified library versions using a security vulnerability database, wherein the security vulnerability database comprises a set of determined security vulnerabilities associated with each version of the identified library.

7. The method of claim 1, wherein generating the measure of risk for each of the identified candidates comprises determining a risk score for each candidate using the corresponding attributes of the identified attributes or the corresponding keywords of the identified one or more keywords.

8. The method of claim 7, wherein determining the risk score for each candidate comprises:

assigning a risk weight to each attribute in the corresponding attributes and each keyword in the corresponding keywords;

determining a number of instances of each attribute in the corresponding attributes and each keyword in the corresponding keywords; and for each attribute and keyword, multiplying the risk weight with the number of instances of the attribute or keyword and aggregating to determine an aggregate risk score for the candidate as the risk score.

9. The method of claim 1, further comprising, for each candidate:

calculating respective percentages of risk contribution for each attribute and each keyword; and displaying the respective percentages in a risk score card comprising a visual representation of the percentages on a graphical user interface.

10. The method of claim 1, wherein generating the measure of risk for each of the identified candidates based on the corresponding attributes of the identified attributes or the corresponding keywords of the identified one or more keywords further comprises:

using a risk identification model configured to process data representing a set of identified attributes and keywords for each candidate to generate an indication of whether the candidate is a high-risk candidate, wherein the risk identification model has been trained by operations comprising:

training the risk identification model on a training data set of previously identified and assessed candidates comprising one or more identified attributes and keywords.

11. The method of claim 1, further comprising, for each of the one or more subsets of identified candidates:

grouping copies of a file in the subset of identified candidates as a single candidate; or grouping versions of a file in the subset of identified candidates as a single candidate.

12. The method of claim 1, wherein determining the one or more subsets of candidates further comprises assigning a label to each identified candidate, and wherein assigning comprises:

using a calculator engine configured to enact one or more arithmetical and logical operations as a calculation on the identified candidates based on the corresponding attributes of the identified attributes or the corresponding keywords of the identified one or more keywords; and determining one or more assigned labels based on the calculation.

13. The method of claim 1, wherein starting a workflow using a pre-built workflow template comprises:

generating a workflow task form configured to accept one or more user-inputs pertaining to values associated with an outcome of a task in accordance with a user-configured identification of one or more user-inputs solicited from one or more users or groups assigned to the task for completion of the task, wherein the user-configured identification of the one or more user-inputs comprises a set of questions indicated as required or optional for task completion, and wherein the one or more users or one or more groups of users are dynamically assigned using a user-input value from a pre-configured metadata form.

14. The method of claim 13, further comprising preventing the workflow from advancing based at least on the one or more user-inputs entered into the workflow task form.

15. A system comprising one or more computers and one or more storage devices storing instructions that are operable, when executed by the one or more computers, to cause the one or more computers to perform operations comprising:

accessing, by one or more computing devices, a repository of files stored on one or more computer-readable storage devices in accordance with a set of one or more scanning parameters, wherein at least one of the one or more scanning parameters is selected from a group consisting of target folders, target drives, file types, file age, file compression technology, scan depth, and keywords;

analyzing, by the one or more computing devices, files stored in the repository to identify candidates that are potentially generated at least in part using one or more artificial intelligence (AI) processes, wherein analyzing the files stored in the repository further comprises:

identifying one or more attributes specific to the file type, wherein the one or more attributes include at least one of: a file extension associated with an AI tool, a reference to a generative AI tool, algorithm, keyword or folder associated with an AI tool, or outputs of an AI file; and identifying one or more keywords within the files;

wherein each of the identified candidates includes at least one attribute among the identified attributes or at least one keyword among the identified keywords that is associated with AI usage;

evaluating associated input and output dependencies of each of the identified candidates, wherein the associated dependencies comprise one or more of libraries, files, or import modules;

generating a measure of risk for each of the identified candidates based on the corresponding attributes of the identified attributes or the corresponding keywords of the identified one or more keywords;

determining one or more subsets of the identified candidates based on the respective measure of risk; and identifying or performing one or more automated tests or actions on each of the one or more subsets, wherein the one or more automated tests or actions comprises at least one of:

performing one or more tests to evaluate one or more AI models associated with the subset;

retaining the subset for further assessment;

deleting the subset from the repository;

moving the subset to a new location in the repository;

adding the subset to a file inventory;

starting a workflow using a pre-built workflow template;

generating a visual representation of the input and output dependencies for each of the identified candidates in the subset and displaying the visual representation on a graphical user interface, wherein the visual representation comprises an interconnected AI map of one or more objects representing a sequence of inputs to outputs in accordance with the dependencies at a specified-hierarchy level; or grouping copies of particular files within the subset.

16. The system of claim 15, the at least one attribute among the identified attributes or at least one keyword among the identified keywords that is associated with AI usage comprises at least one of: a reference to a library, a segment of code, or a number of lines of code.

17. The system of claim 15, further comprising identifying one or more libraries and library versions installed on the one or more computer-readable storage devices.

18. The system of claim 15, wherein the operations further comprise:
identifying one or more files in a first scan in accordance with the set of one or more scanning parameters; and
using results of the first scan in a second scan, wherein using the results comprises filtering the one or more files identified in the first scan in accordance with a second set of one or more scanning parameters.

19. The system of claim 15, wherein generating the measure of risk for each of the identified candidates comprises determining a risk score for each candidate using the corresponding attributes of the identified attributes or the corresponding keywords of the identified one or more keywords.

20. The system of claim 19, wherein determining the risk score for each candidate comprises:
assigning a risk weight to each attribute in the corresponding attributes and each keyword in the corresponding keywords;
determining a number of instances of each attribute in the corresponding attributes and each keyword in the corresponding keywords; and
for each attribute and keyword, multiplying the risk weight with the number of instances of the attribute or keyword and aggregating to determine an aggregate risk score for the candidate as the risk score.

21. The system of claim 15, wherein determining the one or more subsets of candidates further comprises assigning a label to each identified candidate, and wherein assigning comprises:
using a calculator engine configured to enact one or more arithmetical and logical operations as a calculation on the identified candidates based on the corresponding attributes of the identified attributes or the corresponding keywords of the identified one or more keywords; and
determining one or more assigned labels based on the calculation.

22. The system of claim 15, further comprising, for each candidate:
calculating a respective percentages of risk contribution for each attribute and each keyword; and
displaying the respective percentages in a risk score card comprising a visual representation of the percentages on a graphical user interface.

23. The system of claim 15, wherein generating the measure of risk for each of the identified candidates based on the corresponding attributes of the identified attributes or the corresponding keywords of the identified one or more keywords further comprises:
using a risk identification model configured to process data representing a set of identified attributes and keywords for each candidate to generate an indication of whether the candidate is a high-risk candidate, wherein the risk identification model has been trained by operations comprising:
training the risk identification model on a training data set of previously identified and assessed candidates comprising one or more identified attributes and keywords.

24. The system of claim 15, wherein identifying attributes specific to the file type further comprises, for each file, identifying one or more attributes of the file using one or more of file metadata, file location, or file contents, and wherein identifying the one or more attributes of the file using one or more of file metadata, file location, or file contents comprises, for each file:
identifying a file name, file type, attributes specific to the file type, one or more file authors, and organizational information pertaining to the file;
identifying one or more dates of modification, dates of last access, and an author associated with the last modification;
determining a file size;
identifying a location of the file in the repository with respect to one or more file system hierarchies in the repository;
determining security rights of the file in the repository; and
identifying one or more attributes or content indicative of AI usage in the file.

25. The system of claim 15, further comprising, for each of the one or more subsets of identified candidates:
grouping copies of a file in the subset of identified candidates as a single candidate; or
grouping versions of a file in the subset of identified candidates as a single candidate.

26. The system of claim 17, further comprising identifying vulnerabilities associated with each version of the identified library versions using a security vulnerability database, wherein the security vulnerability database comprises a set of determined security vulnerabilities associated with each version of the identified library.

27. The system of claim 15, wherein starting a workflow using a pre-built workflow template comprises:
generating a workflow task form configured to accept one or more user-inputs pertaining to values associated with an outcome of a task in accordance with a user-configured identification of one or more user-inputs solicited from one or more users or groups assigned to the task for completion of the task, wherein the user-configured identification of the one or more user-inputs comprises a set of questions indicated as required or optional for task completion, and wherein the one or more users or one or more groups of users are dynamically assigned using a user-input value from a pre-configured metadata form.

28. The system of claim 27, further comprising preventing the workflow from advancing based at least on the one or more user-inputs entered into the workflow task form.

29. One or more computer readable media storing instructions that are executable by a processing device, and upon such execution cause the processing device to perform operations comprising:
accessing, by one or more computing devices, a repository of files stored on one or more computer-readable storage devices in accordance with a set of one or more scanning parameters, wherein at least one of the one or more scanning parameters is selected from a group consisting of target folders, target drives, file types, file age, file compression technology, scan depth, and keywords;
analyzing, by the one or more computing devices, files stored in the repository to identify candidates that are potentially generated at least in part using one or more artificial intelligence (AI) processes, wherein analyzing the files stored in the repository further comprises:
identifying one or more attributes specific to the file type, wherein the one or more attributes include at least one of: a file extension associated with an AI tool, a reference to a generative AI tool, algorithm, keyword or folder associated with an AI tool, or outputs of an AI file; and identifying one or more keywords within the files;

wherein each of the identified candidates includes at least one attribute among the identified attributes or at least one keyword among the identified keywords that is associated with AI usage;

evaluating associated input and output dependencies of each of the identified candidates, wherein the associated dependencies comprise one or more of libraries, files, or import modules;

generating a measure of risk for each of the identified candidates based on the corresponding attributes of the identified attributes or the corresponding keywords of the identified one or more keywords;

determining one or more subsets of the identified candidates based on the respective measure of risk; and identifying or performing one or more automated tests or actions on each of the one or more subsets, wherein the one or more automated tests or actions comprises at least one of:

performing one or more tests to evaluate one or more AI models associated with the subset;

retaining the subset for further assessment;

deleting the subset from the repository;

moving the subset to a new location in the repository;

adding the subset to a file inventory;

starting a workflow using a pre-built workflow template;

generating a visual representation of the input and output dependencies for each of the identified candidates in the subset and displaying the visual representation on a graphical user interface, wherein the visual representation comprises an interconnected AI map of one or more objects representing a sequence of inputs to outputs in accordance with the dependencies at a specified-hierarchy level; or grouping copies of particular files within the subset.

30. The computer readable media of claim 29, wherein the at least one attribute among the identified attributes or at least one keyword among the identified keywords that is associated with AI usage comprises at least one of: a reference to a library, a segment of code, or a number of lines of code.

31. The computer readable media of claim 29, further comprising identifying one or more libraries and library versions installed on the one or more computer-readable storage devices.

32. The computer readable media of claim 29, wherein the operations further comprise:

identifying one or more files in a first scan in accordance with the set of one or more scanning parameters; and using results of the first scan in a second scan, wherein using the results comprises filtering the one or more files identified in the first scan in accordance with a second set of one or more scanning parameters.

33. The computer readable media of claim 29, wherein generating the measure of risk for each of the identified candidates comprises determining a risk score for each candidate using the corresponding attributes of the identified attributes or the corresponding keywords of the identified one or more keywords.

34. The computer readable media of claim 33, wherein determining the risk score for each candidate comprises:

assigning a risk weight to each attribute in the corresponding attributes and each keyword in the corresponding keywords;

determining a number of instances of each attribute in the corresponding attributes and each keyword in the corresponding keywords; and for each attribute and keyword, multiplying the risk weight with the number of instances of the attribute or keyword and aggregating to determine an aggregate risk score for the candidate as the risk score.

35. The computer readable media of claim 29, further comprising, for each candidate:

calculating a respective percentages of risk contribution for each attribute and each keyword; and displaying the respective percentages in a risk score card comprising a visual representation of the percentages on a graphical user interface.

36. The computer readable media of claim 29, wherein identifying attributes specific to the file type further comprises, for each file, identifying one or more attributes of the file using one or more of file metadata, file location, or file contents, and wherein identifying the one or more attributes of the file using one or more of file metadata, file location, or file contents comprises, for each file:

identifying a file name, file type, attributes specific to the file type, one or more file authors, and organizational information pertaining to the file;

identifying one or more dates of modification, dates of last access, and an author associated with the last modification;

determining a file size;

identifying a location of the file in the repository with respect to one or more file system hierarchies in the repository;

determining security rights of the file in the repository; and identifying one or more attributes or content indicative of AI usage in the file.

37. The computer readable media of claim 31, further comprising identifying vulnerabilities associated with each version of the identified library versions using a security vulnerability database, wherein the security vulnerability database comprises a set of determined security vulnerabilities associated with each version of the identified library.

38. The computer readable media of claim 29, wherein generating the measure of risk for each of the identified candidates based on the corresponding attributes of the identified attributes or the corresponding keywords of the identified one or more keywords further comprises:

using a risk identification model configured to process data representing a set of identified attributes and keywords for each candidate to generate an indication of whether the candidate is a high-risk candidate, wherein the risk identification model has been trained by operations comprising:

training the risk identification model on a training data set of previously identified and assessed candidates comprising one or more identified attributes and keywords.

39. The computer readable media of claim 29, further comprising, for each of the one or more subsets of identified candidates:

grouping copies of a file in the subset of identified candidates as a single candidate; or grouping versions of a file in the subset of identified candidates as a single candidate.

40. The computer readable media of claim 29, wherein determining the one or more subsets of candidates further comprises assigning a label to each identified candidate, and wherein assigning comprises:

using a calculator engine configured to enact one or more arithmetical and logical operations as a calculation on the identified candidates based on the corresponding attributes of the identified attributes or the corresponding keywords of the identified one or more keywords; and determining one or more assigned labels based on the calculation.

41. The computer readable media of claim 29, wherein starting a workflow using a pre-built workflow template comprises:

generating a workflow task form configured to accept one or more user-inputs pertaining to values associated with an outcome of a task in accordance with a user-configured identification of one or more user-inputs solicited from one or more users or groups assigned to the task for completion of the task, wherein the user-configured identification of the one or more user-inputs comprises a set of questions indicated as required or optional for task completion, and wherein the one or more users or one or more groups of users are dynamically assigned using a user-input value from a pre-configured metadata form.

42. The computer readable media of claim 41, further comprising preventing the workflow from advancing based at least on the one or more user-inputs entered into the workflow task form.

* * * * *